(12) United States Patent
Park et al.

(10) Patent No.: US 9,423,899 B2
(45) Date of Patent: Aug. 23, 2016

(54) DISPLAY DEVICE

(71) Applicant: Samsung Display Co., Ltd., Yongin, Gyeonggi-Do (KR)

(72) Inventors: Jihong Park, Suwon-si (KR); Incheol Kim, Goyang-si (KR); Myungjong Kim, Seoul (KR); Seungho Nam, Seongnam-si Gyeonggi-do (KR); Kangwon Lee, Seoul (KR); Seockjin Lee, Hwaseong-si (KR); Seongmo Hwang, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 507 days.

(21) Appl. No.: 13/910,919

(22) Filed: Jun. 5, 2013

(65) Prior Publication Data
US 2014/0204051 A1 Jul. 24, 2014

(30) Foreign Application Priority Data
Jan. 23, 2013 (KR) .................. 10-2013-0007567

(51) Int. Cl.
*G06F 3/041* (2006.01)
*G06F 3/044* (2006.01)

(52) U.S. Cl.
CPC .............. *G06F 3/0412* (2013.01); *G06F 3/044* (2013.01); *G06F 3/0416* (2013.01)

(58) Field of Classification Search
CPC .......... G06F 1/10; G06F 1/26; G06F 13/3625
See application file for complete search history.

(56) References Cited

U.S. PATENT DOCUMENTS

| 6,707,450 B2 | 3/2004 | Ahn et al. |
| 8,415,959 B2 * | 4/2013 | Badaye .................. G06F 3/044 324/658 |
| 2002/0130849 A1 | 9/2002 | Ahn et al. |
| 2008/0252608 A1 * | 10/2008 | Geaghan ................. G06F 3/044 345/173 |
| 2010/0289755 A1 | 11/2010 | Zhu et al. |
| 2011/0025636 A1 * | 2/2011 | Ryu ...................... G06F 3/0416 345/173 |
| 2011/0141042 A1 | 6/2011 | Kim et al. |
| 2011/0187666 A1 * | 8/2011 | Min ........................ G06F 3/041 345/173 |
| 2011/0187671 A1 | 8/2011 | Huang |
| 2013/0016052 A1 * | 1/2013 | Lien ....................... G06F 3/044 345/173 |

FOREIGN PATENT DOCUMENTS

| JP | 2009-053043 | 3/2009 |
| JP | 2009512091 | 3/2009 |
| JP | 2009116224 | 5/2009 |
| KR | 1020110044670 | 4/2011 |

(Continued)

*Primary Examiner* — Michael Faragalla
(74) *Attorney, Agent, or Firm* — Innovation Counsel LLP

(57) ABSTRACT

A display device includes a first pixel electrode corresponding to a first pixel area. The display device further includes a transistor electrically connected to the first pixel electrode. The display device further includes a plurality of gate lines extending in a first direction and including a first gate line, the first gate line being electrically connected to the transistor and being configured to transmit a first gate signal for controlling the transistor. The display device further includes a plurality of first-type sensors including a first first-type sensor, the first first-type sensor being configured to provide a first output signal according to at least the first gate signal. The display device further includes a processing part electrically connected to the first first-type sensor and configured to use the first output signal for determining a first coordinate value associated with a touch applied on the display device.

20 Claims, 19 Drawing Sheets

(56) References Cited

FOREIGN PATENT DOCUMENTS

| KR | 101085089 | 11/2011 |
| KR | 1020120016535 | 2/2012 |
| KR | 1020120017755 | 2/2012 |
| KR | 1020120036524 | 4/2012 |

* cited by examiner

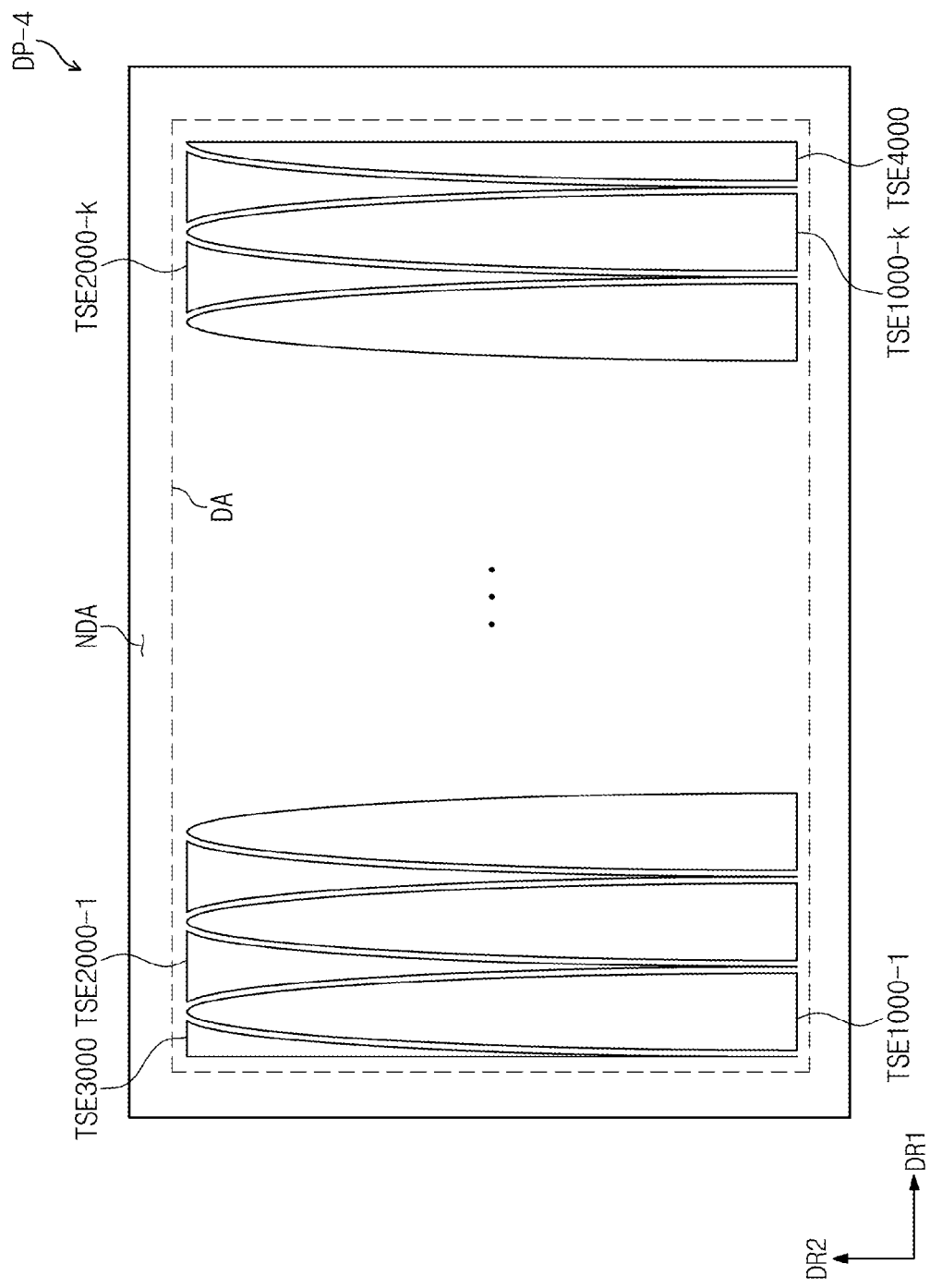

DISPLAY DEVICE

CROSS-REFERENCE TO RELATED APPLICATION

This U.S. non-provisional patent application claims priority to and benefit of Korean Patent Application No. 10-2013-0007567, filed on Jan. 23, 2013, the contents of which are incorporated herein by reference.

BACKGROUND

1. Field of the Invention

The present invention relates to a display device. More particularly, the present invention relates to a display device capable of sensing a touch event.

2. Description of the Related Art

A display device may include a touch panel that is configured to obtain coordinate information of a position at which a touch event occurs.

For example, the touch panel may be a resistive touch panel, acapacitive touch panel, or an electromagnetic touch panel, depending on its operating principle. A capacitance touch panel typically includes an input touch electrode and an output touch electrode, which are distinct from each other according to their functions. The input touch electrode is insulated from the output touch electrode and may cross the output touch electrode.

In general, the touch panel may be attached to the outside of a display panel. The display panel may display an image according to the coordinate information provided from the touch panel. Because the touch panel is attached to the display panel, the overall thickness of the display device may be substantially large. The touch panel, which is separately manufactured, may substantially increase the manufacturing cost of the display device.

SUMMARY

Embodiments of the present invention may be related to a touch-screen display device, or a display device having a touch panel function.

One or more embodiments of the invention may be related to a display device that includes a first pixel electrode corresponding to a first pixel area. The display device further includes a transistor electrically connected to the first pixel electrode. The display device further includes a plurality of gate lines extending in a first direction and including a first gate line, the first gate line being electrically connected to the transistor and being configured to transmit a first gate signal for controlling the transistor. The display device further includes a plurality of first-type sensors including a first first-type sensor, the first first-type sensor being configured to provide a first output signal according to at least the first gate signal. The display device further includes a processing part electrically connected to the first first-type sensor and configured to use the first output signal for determining a first coordinate value associated with a touch applied on the display device.

In one or more embodiments, the first first-type sensor is configure to provide the first output signal according to a plurality of gate signals sequentially transmitted by the plurality of gate lines.

In one or more embodiments, a first portion of the first first-type sensor is located closer to the first gate line than a second portion of the first first-type sensor, and in the first direction the first portion of the first first-type sensor is shorter than the second portion of the first first-type sensor.

In one or more embodiments, the second portion of the first first-type sensor is disposed between the first portion of the first first-type sensor and a third portion of the first first-type sensor, and in the first direction the second portion of the first first-type sensor is shorter than the third portion of the first first-type sensor.

In one or more embodiments, the display device further includes a plurality of second-type sensors including a first second-type sensor. The first second-type sensor is configured to provide a second output signal according to at least the first gate signal. A first portion of the first second-type sensor is aligned with the first portion of the first first-type sensor in the first direction. A second portion of the first second-type sensor is aligned with the second portion of the first first-type sensor in the first direction. In the first direction the first portion of the first second-type sensor is longer than the second portion of the first second-type sensor.

In one or more embodiments, the processing part is configured to determine the first coordinate value using at least one of a position of the first first-type sensor and a position of the first second-type sensor after detecting existence of at least one of a difference between a value of the first output signal and a first reference value and a difference between a value of the second output signal and a second reference value.

In one or more embodiments, the first second-type sensor immediately neighbors the first first-type sensor; the processing part is configured to determine the first coordinate value using at least one of the position of the first first-type sensor and the position of the first second-type sensor after detecting the existence of both the difference between the value of the first output signal and the first reference value and the difference between the value of the second output signal and the second reference value.

In one or more embodiments, the processing part is configured to determine a second coordinate value associated with the touch using a first amount and/or a second amount, the first amount corresponding to the difference between the value of the first output signal and the first reference value, the second amount corresponding to the difference between the value of the second output signal and the second reference value.

In one or more embodiments, the first-type sensors and the second-type sensors are alternately disposed.

In one or more embodiments, the display device further includes a third-type sensor configured to provide a third output signal to be used by the processing part and a fourth-type sensor configured to provide a fourth output signal to be used by the processing part. The first-type sensors and the second-type sensors are disposed between the third-type sensor and the fourth-type sensor. Each of a shape of the third-type sensor and a shape of the fourth-type sensor is different from each of a shape of the first first-type sensor and a shape of the first second-type sensor.

In one or more embodiments, the display device further includes an insulating disposed between the first first-type sensor and the first gate line, wherein the first first-type sensor directly contacts a first surface of the insulating layer, and wherein the first gate line directly contacts a second surface of the insulating layer.

In one or more embodiments, the display device further includes a common electrode overlapping the first pixel electrode and configured to receive a reference voltage. The display device further includes a common line electrically connected to the common electrode and directly contacting the second surface of the insulating layer.

In one or more embodiments, the processing part is configured to determine the first coordinate value using a position of the first first-type sensor after detecting existence of a difference between a value of the first output signal and a first reference value.

In one or more embodiments, the processing part is configured to determine a second coordinate value associated with the touch using an amount of the difference between the value of the first output signal and the first reference value.

In one or more embodiments, the first coordinate value is associated with a first coordinate axis that is parallel to the first gate line, and wherein the second coordinate value is associated with a second coordinate axis that is perpendicular to the first gate line.

In one or more embodiments, the plurality of first-type sensors further includes a second first-type sensor and a third first-type sensor, wherein the second first-type sensor is configured to provide a second output signal according to at least the first gate signal, wherein the third first-type sensor is configured to provide a third output signal according to at least the first gate signal, and wherein the first reference value is equal to at least one of a value of the second output signal and a value of the third output signal.

In one or more embodiments, the processing part is configured to periodically determine, once in each period, coordinate information associated with at least one possible touch applied on the display, and the plurality of gate lines is configured to transmit a constant plurality (or constant number) of gate signals, e.g., 3 gate signals, in the each period.

In one or more embodiments, the plurality of gate lines further includes a second gate line, wherein the second gate line is configured to transmit a second gate signal, the first output signal includes a first pulse generated and a second pulse, the first pulse is generated according to the first gate signal, the second pulse is generated according to the second gate signal, and an amplitude of the first pulse is less than an amplitude of the second pulse.

In one or more embodiments, a first portion of the first first-type sensor overlaps the first gate line; a second portion of the first first-type sensor overlaps the second gate line and is longer than the first portion of the first first-type sensor in the first direction.

In one or more embodiments, the display device further includes a second pixel electrode corresponding to a second pixel area, wherein the first first-type sensor is substantially transparent, partially covers the first pixel area, and completely covers the second pixel area.

In one or more embodiments, the first first-type sensor has a lattice structure, and a portion of the first first-type sensor surrounds the first pixel area in a plan view of the display device.

Embodiments of the invention may be related to a display device that includes a first base substrate, a plurality of gate lines, a plurality of pixels, a plurality of touch sensors, and a touch sensing part. The first base substrate provides a touch surface and includes a light blocking area and a plurality of pixel areas. The gate lines are disposed on the first base substrate, extended in a first direction, arranged in a second direction crossing the first direction, and respectively applied with gate signals having different activation periods.

In one or more embodiments, the pixels are disposed to respectively correspond to the pixel areas and activated in response to the gate signals. The touch sensors are disposed on the first base substrate and capacitively coupled to the gate lines using the gate signals as sensing signals. The touch sensing part calculates coordinate information of a touch position using output signals provided from the touch sensors.

In one or more embodiments, the touch sensors are extended in the second direction and a width in the first direction of each of the touch sensors is varied along the second direction.

In one or more embodiments, the touch sensors include first touch sensors each having the width in the first direction, which increases along the second direction, and second touch sensors each having the width in the first direction, which decreases along the second direction.

In one or more embodiments, the first touch sensors are alternately arranged with the second touch sensors. Each of the output signals includes a plurality of pulses having different levels and being generated on the basis of the gate signals.

In one or more embodiments, the touch sensing part calculates coordinate information of the touch position in the second direction on the basis of a variation of the level of the pulses. The touch sensing part calculates coordinate information of the touch position on the basis of a portion of the pulses.

In one or more embodiments, the gate lines and the touch sensors are disposed at a lower portion of the first base substrate. The touch sensors are disposed on a lower surface of the first base substrate, and the gate lines are disposed on an insulating layer that covers the touch sensors.

In one or more embodiments, the display device further includes a plurality of connection lines disposed on the first base substrate, respectively connected to the touch sensors, and applying the output signals to the touch sensing part.

In one or more embodiments, the touch sensors are divided into a plurality of groups and the groups are arranged in the second direction.

In one or more embodiments, the touch sensors are arranged in a matrix form. The touch sensors have a same shape and size.

According to embodiments of the inventions, gate lines may operate as input touch electrodes of a touch panel, and sensors may operate as output touch electrodes of the touch panel. Gate signals applied to and transmitted by the gate lines are used as sensing signals of the touch panel. Accordingly, the touch panel is an integral part of a display panel without requiring substantial additional thickness and additional components of the display panel. Advantageously, the thickness and manufacturing cost of an associated touch-screen display device may be minimized.

In one or more embodiments, the display device further includes one conductive layer to sense the touch event.

In one or more embodiments, each of the output signals includes a plurality of pulses generated on the basis of the gate signals sequentially applied to the gate lines. The touch sensing part may calculate the coordinate information of the touch position from the portion of the pulses. In addition, the touch event may be detected several times during a frame period in which the gate signals are sequentially applied to the gate lines.

BRIEF DESCRIPTION OF THE DRAWINGS

The above and other advantages of the present invention will become readily apparent by reference to the following detailed description when considered in conjunction with the accompanying drawings wherein:

FIG. 15C is a plan view illustrating a display panel according to one or more embodiments of the present invention.

DETAILED DESCRIPTION

Figure 1:
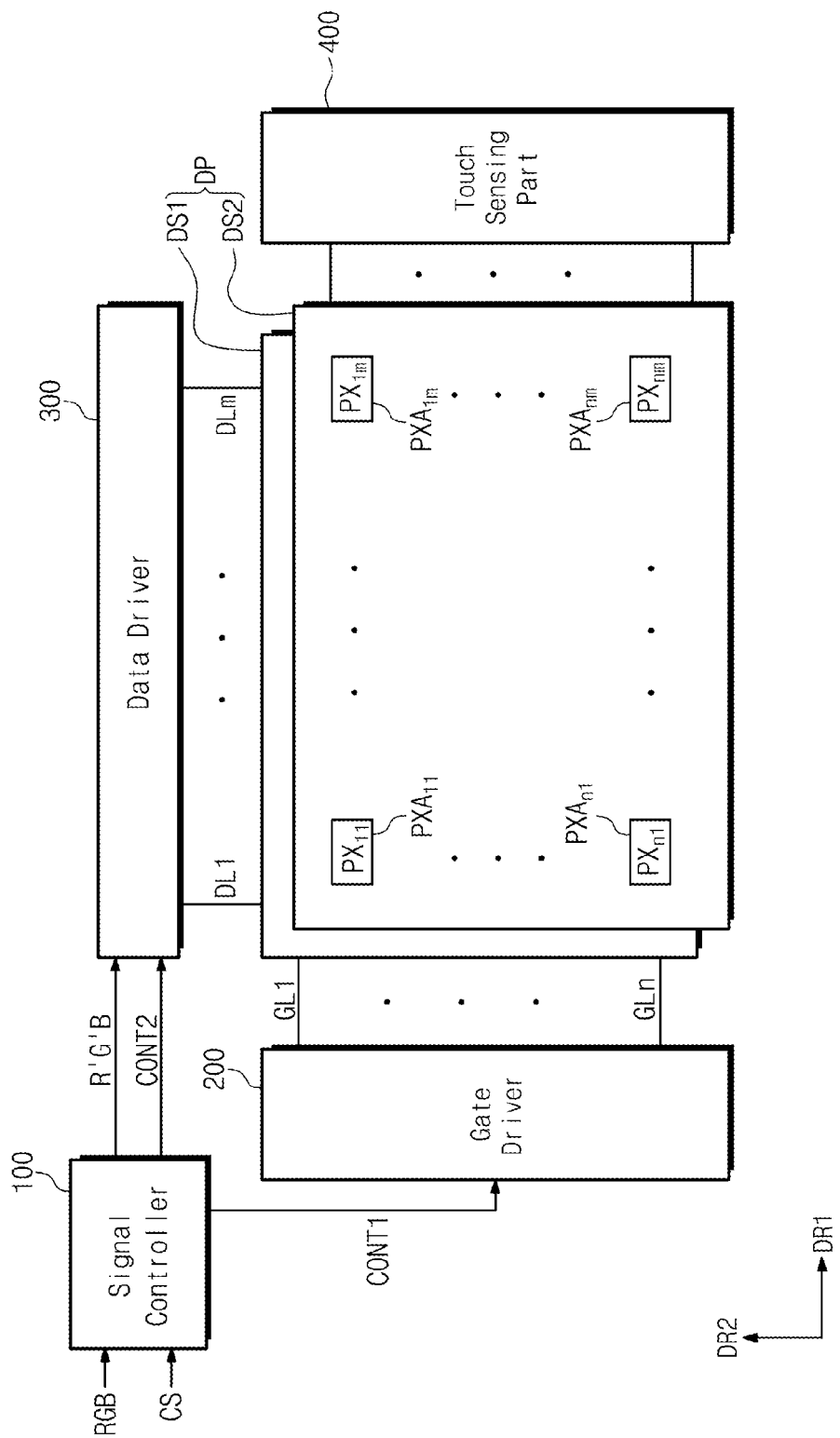
FIG. 1 is a block diagram illustrating a display device according to one or more embodiments of the present invention.

In the specification, when an element or layer is referred to as being "on", "connected to" or "coupled to" another element or layer, it can be directly on, directly connected, or directly coupled to the other element or layer or intervening elements or layers may be present. In contrast, when an element is referred to as being "directly on", "directly connected to", or "directly coupled to" another element or layer, there are no (intended) intervening elements or layers (except possible environmental elements, such as air) present. Like numbers may refer to like elements in the specification. As used herein, the term "and/or" may include any and all combinations of one or more of the associated listed items.

Although the terms first, second, etc. may be used herein to describe various elements, components, regions, layers and/or sections, these elements, components, regions, layers and/or sections should not be limited by these terms. These terms may be used to distinguish one element, component, region, layer or section from another region, layer or section. Thus, a first element, component, region, layer or section discussed below could be termed a second element, component, region, layer or section without departing from the teachings of the present invention. The description of an element as a "first" element may not require or imply the presence of a second element or other elements. The terms first, second, etc. may also be used herein to differentiate different categories of elements. For conciseness, the terms first, second, etc. may represent first-type (or first-category), second-type (or second-category), etc., respectively.

Spatially relative terms, such as "beneath", "below", "lower", "above", "upper", etc., may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments and is not intended to be limiting of the invention. As used herein, the singular forms, "a", "an", and "the" may include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. Terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
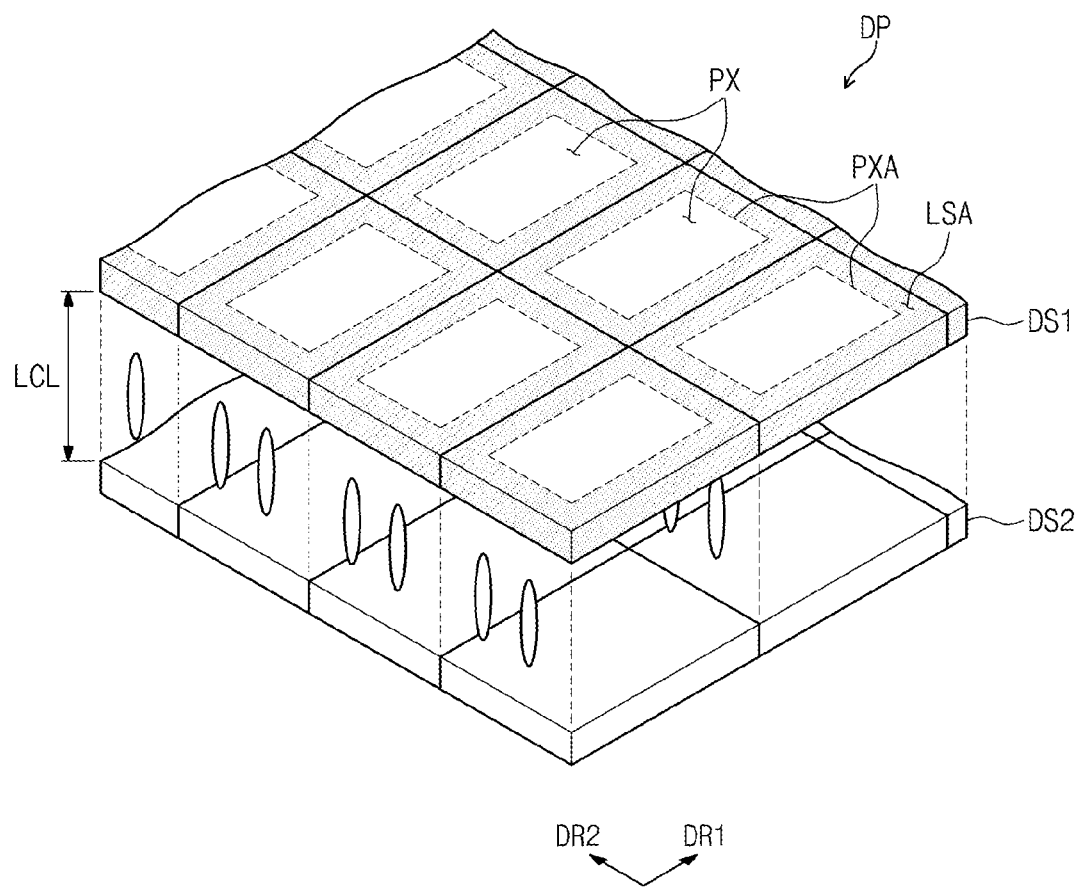
FIG. 2 is a perspective view illustrating a portion of a display panel illustrated in FIG. 1.
Figure 3:
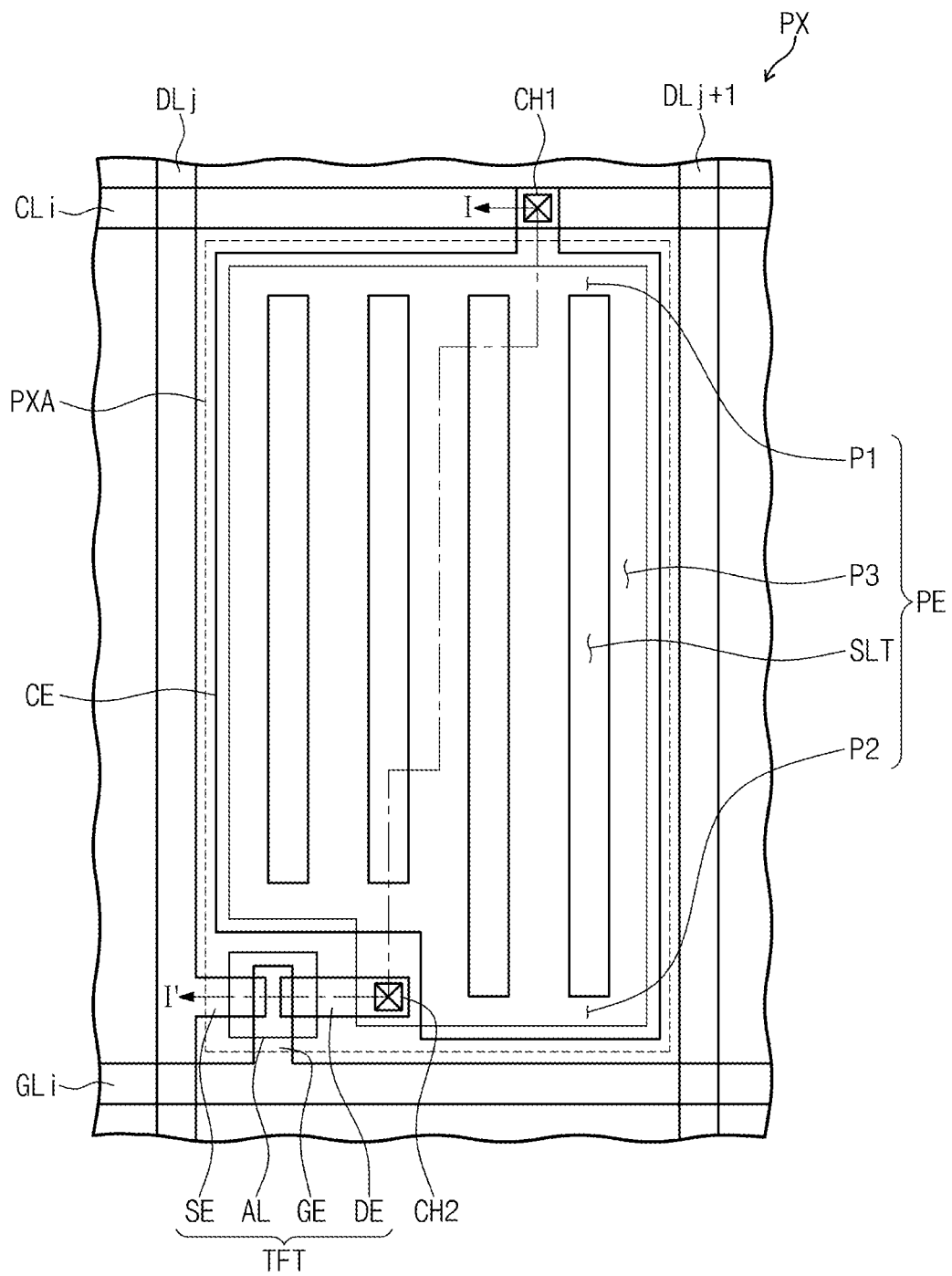
FIG. 3 is a rear plan view illustrating a pixel area of a first display substrate illustrated in FIG. 2.
Figure 4:
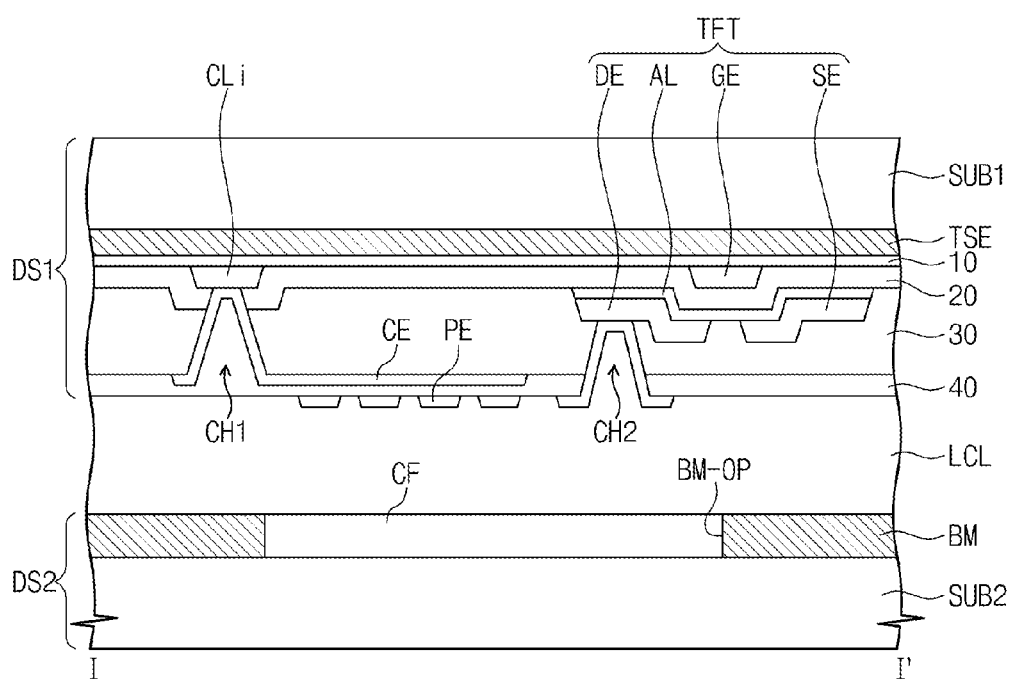
FIG. 4 is a cross-sectional view illustrating a display panel taken along a line I-I' indicated in FIG. 3.
Figure 5:
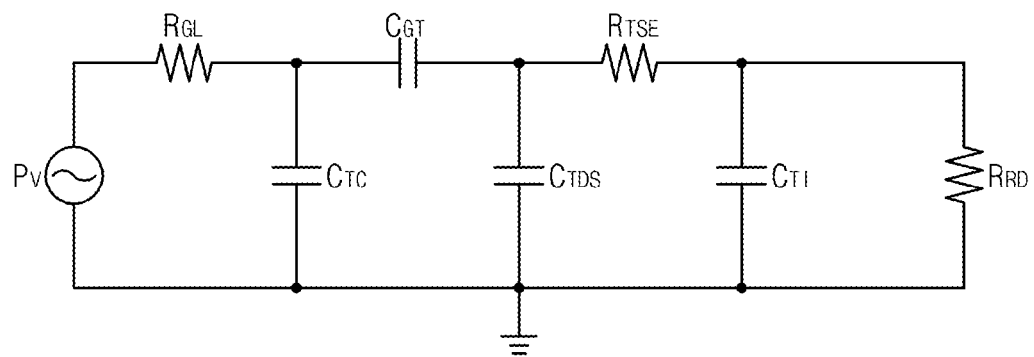
FIG. 5 is an equivalent circuit diagram illustrating a display panel in which a touch event occurs.
Figure 6:
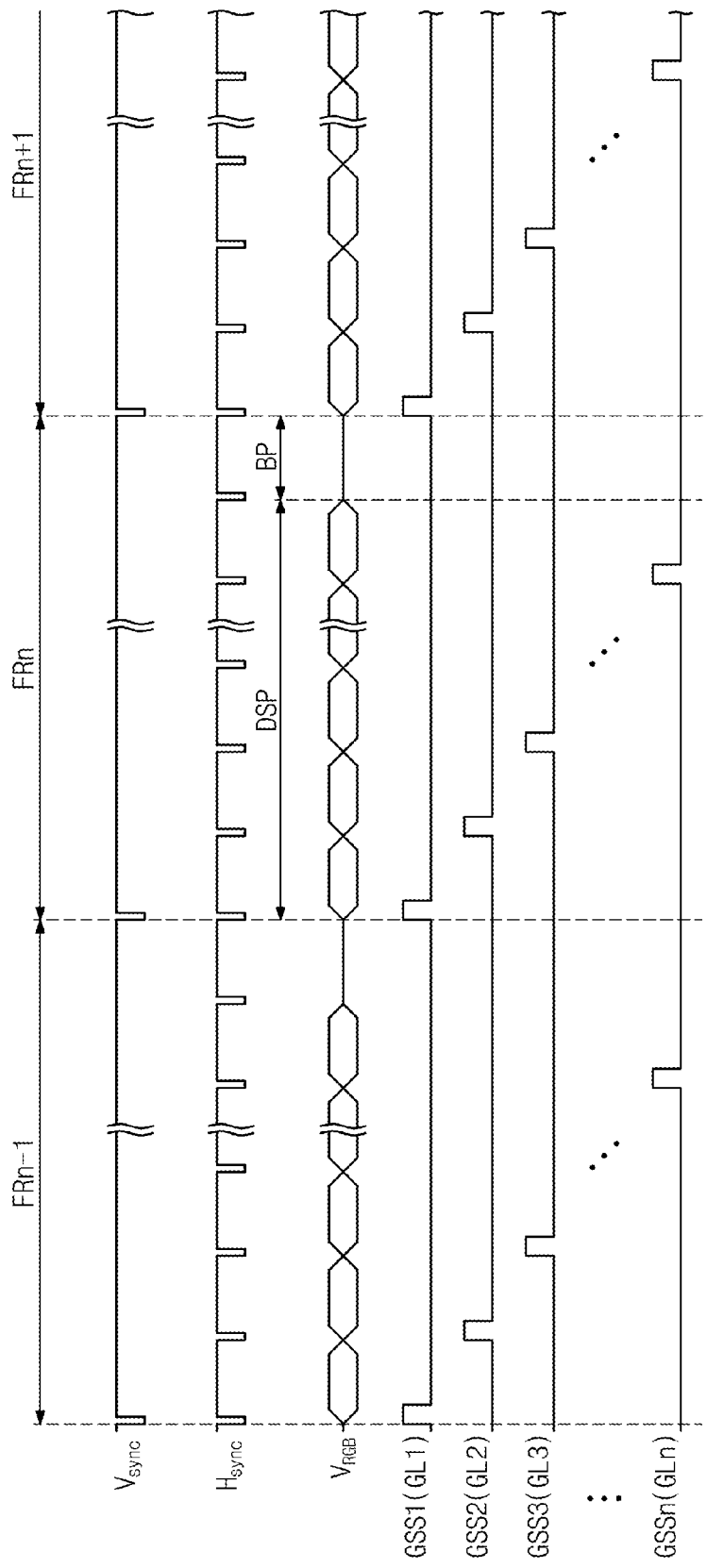
FIG. 6 is a timing diagram illustrating signals applied to the display panel illustrated in FIG. 1.

FIG. 1 is a block diagram illustrating a display device according to one or more embodiments of the present invention. FIG. 2 is a perspective view illustrating a portion of a display panel illustrated in FIG. 1. FIG. 3 is a rear plan view illustrating a pixel area of a first display substrate illustrated in FIG. 2. FIG. 4 is a cross-sectional view illustrating a display panel taken along a line I-I' indicated in FIG. 3. FIG. 5 is an equivalent circuit diagram illustrating a display panel in which a touch event occurs. FIG. 6 is a timing diagram illustrating signals applied to the display panel illustrated in FIG. 1.

Referring to FIG. 1, the display device includes a display panel DP, a signal controller 100, a gate driver 200, a data driver 300, and a touch sensing part 400 (which is a processing part).

The display panel DP may be, for example, a liquid crystal display panel, an organic light emitting display panel, an electrophoretic display panel, or an electrowetting display panel. In the one or more embodiments, the display panel DP may be a liquid crystal display panel. The display device may further include a backlight unit (not illustrated), which is configured to supply light to the liquid crystal display panel, and a pair of polarizing plates (not illustrated).

The display panel DP includes a first display substrate DS1, a second display substrate DS2 overlapping the first display substrate DS1, and a liquid crystal layer LCL (illustrated in FIG. 2) disposed between the first display substrate DS1 and the second display substrate DS2.

In one or more embodiments, the display panel may be an organic light emitting display panel. The organic light emitting display panel may include a sealing layer without including the second display substrate.

The display panel DP includes a plurality of pixels $PX_{11}$ to $PX_{nm}$ corresponding to a plurality of pixel areas PXAs, including pixel areas $PXA_{11}$ to $PXA_{nm}$. Each of the pixels $PX_{11}$ to $PX_{nm}$ is connected to a corresponding gate line of gate lines GL1 to GLn and a corresponding data line of data lines DL1 to DLm. The pixels $PX_{11}$ to $PX_{nm}$ are activated in response to gate signals applied to the gate lines GL1 to GLn. Thin film transistors included in the pixels $PX_{11}$ to $PX_{nm}$ may be turned on in response to the gate signals. The pixels $PX_{11}$ to $PX_{nm}$ are arranged in a matrix form.

The gate lines GL1 to GLn and the data lines DL1 to DLm are disposed on the first display substrate DS1. The gate lines GL1 to GLn extend in a first direction DR1 and are arranged in a second direction DR2. The data lines DL1 to DLm are insulated from the gate lines GL1 to GLn and may cross the gate lines GL1 to GLn. The data lines DL1 to DLm extend in the second direction DR2 and are arranged in the first direction DR1.

The first display substrate DS1 includes a plurality of common lines (not illustrated) and a plurality of touch sensors (not illustrated). The common lines may correspond to the gate lines GL1 to GLn in a one-to-one correspondence.

Referring to FIG. 2, the first display substrate DS1 is disposed on the second display substrate DS2. The first display substrate DS1 provides a touch surface on which a touch event may occur. The touch event may occur above or on a surface of the first display substrate DS1. In one or more embodiments, a touch may be directly applied on a surface of the first substrate SUB1. In one or more embodiments, a touch may be applied on an additional layer, e.g., a polarizing plate and/or a protecting layer, disposed on the first display substrate DS1.

The display panel DP may include a light blocking area LSA and the pixel areas PXAs. The pixel areas PXAs illustrated in FIG. 2 may represent a portion of the pixels areas $PXA_{11}$ to $PXA_{nm}$ illustrated in FIG. 1; the pixels PXs illustrated in FIG. 2 may represent a portion of the pixels $PX_{11}$ to $PX_{nm}$ illustrated in FIG. 1. The pixels PXs correspond to and/or are disposed in the pixel areas PXAs.

The pixels areas PXAs may transmit light generated by the backlight unit. The light blocking area LSA surrounds the pixel areas PXAs and is configured to block light. In one or more embodiments, pixel area PXA may include a portion that is configured to block light.

FIGS. 3 and 4 illustrate one pixel area PXA of the pixel areas PXAs illustrated in FIG. 2. The pixel PX disposed in and/or corresponding to the pixel area PXA includes a thin film transistor TFT, a common electrode CE, and a pixel electrode PE. A portion of the pixel area PXA, e.g., a portion corresponding to the thin film transistor TFT, may be configured to block light, for protecting the thin film transistor TFT.

As illustrated in FIGS. 3 and 4, the first display substrate DS1 includes a first base substrate SUB1, a plurality of insulating layers (e.g., a first insulating layer 10), and a plurality of conductive layers (e.g., a gate electrode GE), wherein the insulating layers and/or the conductive layers may be disposed on the first base substrate SUB1. FIG. 4 illustrates one touch sensor TSE of the touch sensors of the display device.

The touch sensor TSE is disposed on a lower surface of the first base substrate SUB1 and is disposed between the first base substrate SUB1 and the first insulating layer 10. The touch sensor TSE may include a metal having a low reflectivity and/or may include a transparent metal oxide, e.g., at least one of indium tin oxide, zinc oxide, etc. The metal having a low reflectivity may include at least one of chromium oxide, chromium nitride, titanium oxide, and an alloy of one or more of these materials.

In one or more embodiments, an insulating layer may be disposed between the first base substrate SUB1 and the touch sensor TSE. The insulating layer may include at least one organic layer and/or at least one inorganic layer.

A first insulating layer 10 is disposed on the touch sensor TSE. The gate line GLi and the common line CLi are disposed on the first insulating layer 10 and may directly contact the first insulating layer. A gate electrode GE of the thin film transistor TFT is branched from the gate line GLi. The first insulating layer 10 may be disposed between the touch sensor TSE and the gate line GLi, between the touch sensor TSE and the gate electrode GE, and/or between the touch sensor TSE and the common line CLi.

A second insulating layer 20 is disposed on the first insulating layer 10 to cover the gate line GLi and the common line CLi. The gate line GLi, the gate electrode GE, and/or the common line CLi may be disposed between the second insulating layer 20 and the first insulating layer 10 and may be disposed between the second insulating layer 20 and the touch sensor TSE. The data lines DLj and DLj+1 are disposed on the second insulating layer 20. A semiconductor layer AL is disposed on the second insulating layer 20 and may overlap the gate electrode GE. A source electrode SE of the thin film transistor TFT is branched from one of the data lines DLj and DLj+1, e.g., the data line DLj. A drain electrode DE of the thin film transistor TFT is disposed on the second insulating layer 20 and is spaced apart from the source electrode SE. The source electrode SE and the drain electrode DE may overlap the semiconductor layer AL.

A third insulating layer 30 is disposed on the second insulating layer 20 to cover the data lines DLj and DLj+1. The common electrode CE is disposed on the third insulating layer 30. The common electrode CE is connected to the common line CLi through a first contact hole CH1 formed through the second insulating layer 20 and the third insulating layer 30.

A fourth insulating layer 40 is disposed on the third insulating layer 30 to cover the common electrode CE. The pixel electrode PE is disposed on the fourth insulating layer 40 and may overlap the common electrode CE. The pixel electrode PE is connected to the drain electrode DE through a second contact hole CH2 formed through the third insulating layer 30 and the fourth insulating layer 40. A protective layer (not illustrated) that protects the pixel electrode PE may be disposed on the fourth insulating layer 40. An alignment layer (not illustrated) may be disposed on the fourth insulating layer 40.

The pixel electrode PE includes a plurality of slits SLT. The pixel electrode PE includes a first horizontal portion P1, a second horizontal portion P2 spaced apart from the first horizontal portion P1, and a plurality of vertical portions P3 that connects the first horizontal portion P1 and the second horizontal portion P2. In one or more embodiments, the pixel electrode PE may include a plurality of cut-away portions.

The thin film transistor TFT may output a data voltage received through the data line DLj in response to a gate signal received through the gate line GLi. The common electrode CE may receive a reference voltage. The pixel electrode PE may receive a pixel voltage corresponding to the data voltage. The pixel voltage and the reference voltage may have different voltage levels. The common electrode CE and the pixel electrode PE may form a (horizontal) electric field. According to the (horizontal) electric field, directors included in the liquid crystal layer LCL may be oriented.

In one or more embodiments, the common electrode CE and the pixel electrode PE may be disposed on the same layer. In one or more embodiments, the common electrode CE may be disposed on the second display substrate DS2, and thus the common electrodes CE and the pixels electrodes PE may form a vertical electric field.

The second display substrate DS2 includes a second base substrate SUB2, a black matrix BM, and a color filter CF. The black matrix BM includes an opening portion BM-OP. The color filter CF is disposed at and/or overlaps the opening portion BM-OP. In the one or more embodiments, the pixel area PXA corresponds to the opening portion BM-OPs, and the light blocking area LSA corresponds to an area in which the black matrix BM is disposed. FIGS. 3 and 4 show one pixel area PXA, but the black matrix BM may include a plurality of opening portions corresponding to the plurality of pixel areas PXAs illustrated in FIG. 2.

In one or more embodiments, color filters CFs may correspond to the opening portions BM-OPs. The color filters CFs may have different colors. For instance, some of the color filters CFs may have a red color, some of the color filters may have a green color, and some of the color filters may have a blue color.

In one or more embodiments, the black matrix BM and the color filter CF may be disposed on the first base substrate SUB1. In one or more embodiments, the first insulating layer 10 may include the black matrix BM and the color filter CF.

Operation of the touch sensor TSE will be described with reference to at least FIG. 1, FIG. 4, and FIG. 5. A power source voltage Pv is applied to the gate line GLi and the gate electrode GE. The power source voltage Pv is a gate voltage. A first resistor $R_{GL}$ represents the internal resistance of the gate line GLi, a second resistor $R_{TSE}$ represents the internal resistance of the touch sensor, and a third resistor $R_{RD}$ represents one or more other resistances in the display panel DP.

When the gate voltage (Pv) is applied to the gate line GLi, the gate line GLi is capacitively coupled to the touch sensor TSE. In other words, the gate line GLi and the touch sensor TSE form a capacitor $C_{GT}$. In one or more embodiments, the gate line GLi and the common electrode CE form a first parasitic capacitance $C_{TC}$; the gate line GLi, the drain electrode DE, and the source electrode SE form a second parasitic capacitance $C_{TDS}$.

When the input device (e.g., a stylus or a user's finger) is disposed on the first base substrate SUB1, i.e., when a touch event occurs, the gate line GLi and the input device form a variable capacitor $C_{TT}$. Accordingly, the electric potential of the touch sensor TSE becomes low. The touch sensing part 400 detects the variation of the electric potential of the touch sensor TSE, which is generated when the touch event occurs.

Therefore, the gate line GLi and the gate electrode GE may serve as an input touch electrode of a touch panel, and the touch sensor TSE may serve as an output touch electrode of the touch panel. The gate voltage may be used as a sensing signal of the touch panel.

Referring to FIGS. 1 and 6, the signal controller 100 may receive input image signals RGB and may convert the input image signals RGB to image data R'G'B' suitable for an operational mode. In one or more embodiments, the signal controller 100 may receive various control signals CS, e.g., one or more of a vertical synchronization signal Vsync, a horizontal synchronization signal Hsync, a main clock signal, a data enable signal, etc., and may output a first control signal CONT1 and a second control signal CONT2.

The gate driver 200 may output gate signals to the gate lines GL1 to GLn in response to the first control signal CONT1. The first control signal CONT1 includes one or more of a vertical start signal that starts an operation of the gate driver 200, a gate clock signal that determines an output timing of the gate voltage, and an output enable signal that determines an ON-pulse width of the gate voltage.

The data driver 300 may receive the second control signal CONT2 and the image data R'G'B'. The data driver 300 may convert the image data R'G'B' to data voltages $V_{RGB}$ and may apply the data voltages $V_{RGB}$ to the data lines DL1 to DLm.

The second control signal CONT2 includes one or more of a horizontal start signal that starts an operation of the data driver 300, a polarity inversion signal that inverts a polarity of the data voltages $V_{RGB}$, an output indicating signal that determines an output timing of the data voltages $V_{RGB}$ from the data driver 300, and a data enable signal that controls on and off of the data voltages $V_{RGB}$. The data enable signal is used to define a display period DSP and a non-display period BP.

The touch sensing part 400 may receive output signals provided from the touch sensors. The touch sensing part 400 may calculate the coordinate information of the position at which the touch event occurs based on the output signals.

In one or more embodiments, the touch sensing part 400 includes signal processors (which are configured to receive the output signals), a multiplexer, and a comparator. The signal processors may correspond to the touch sensors in a one-to-one correspondence.

Each of the signal processors may include an amplifier, a noise filter, and an analog-to-digital converter. The amplifier may amplify a corresponding output signal of the output signals. The noise filter may remove a noise component in the amplified output signals. The analog-to-digital converter may convert the output signals from which the noise component is removed to digital signals.

The multiplexer provides the digital signals provided from the signal processors to the comparator. The comparator compares the digital signals to a reference value to detect the touch sensor at the position where the touch event occurs; accordingly, the touch sensing part 400 may determine the touch position.

Referring to FIG. 6, the vertical synchronization signal Vsync defines a plurality of frame periods, such as FRn−1, FRn, and FRn+1. Each of the frame periods FRn−1, FRn, and FRn+1 may include a display period DSP and a non-display period BP. In one or more embodiments, the non-display period BP may be omitted. The horizontal synchronization signal Hsync defines a plurality of horizontal periods in which the data voltages $V_{RGB}$ are output from the data driver 300.

The gate signals GSS1 to GSSn are sequentially applied to the gate lines GL1 to GLn during each of the frame periods FRn−1, FRn, and FRn+1. The gate signals GSS1 to GSSn are pulse signals having different starting points of activation periods, wherein the activation periods may have the same length. The gate signals GSS1 to GSSn may have the same level in each activation period.

The output signals applied to the touch sensing part 400 are related to the gate signals GSS1 to GSSn. The gate lines GL1 to GLn, the gate signals GSS1 to GSSn, the touch sensors, and the output signals are further discussed with further reference to FIGS. 7 to 12C.

Figure 7:
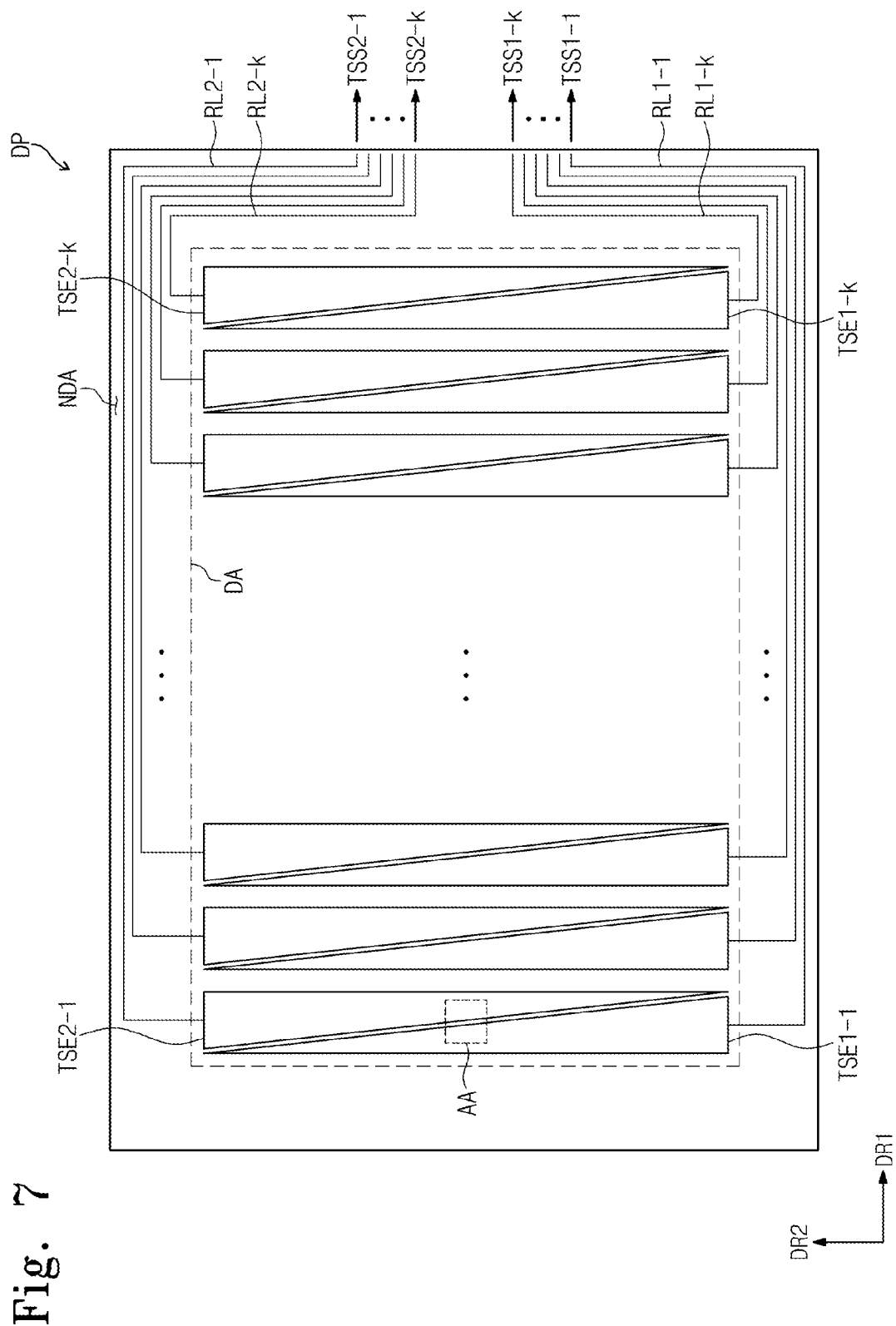
FIG. 7 is a plan view illustrating the display panel illustrated in FIG. 1.
Figure 8A:
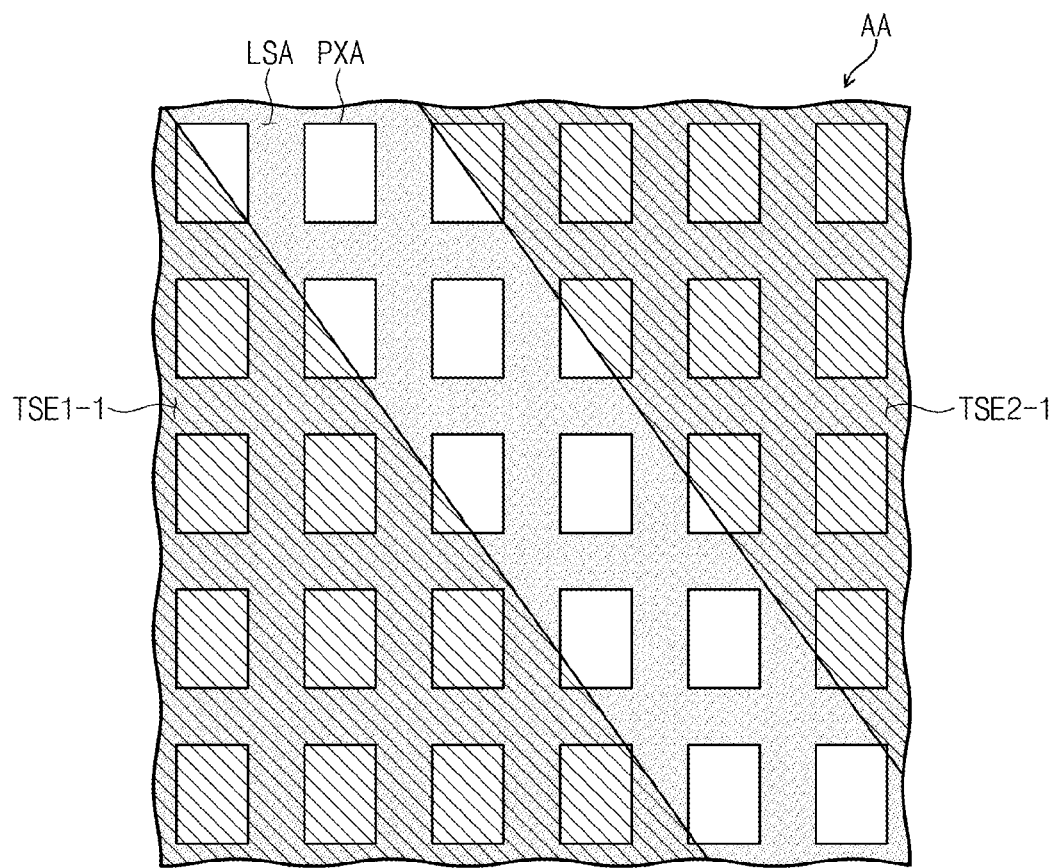
FIG. 8A is a plan view illustrating an area AA of FIG. 7 according to one or more embodiments of the invention.
Figure 8B:
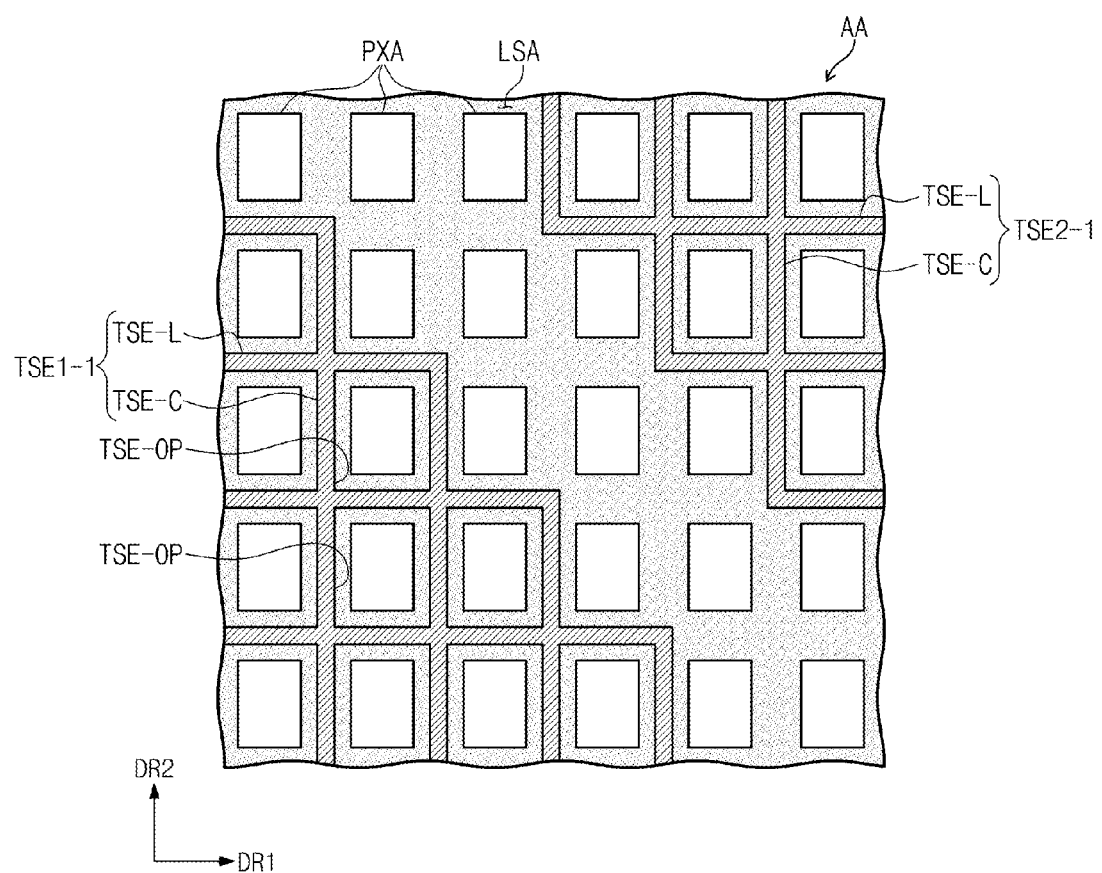
FIG. 8B is a plan view illustrating an area AA of FIG. 7 according to one or more embodiments of the invention.

FIG. 7 is a plan view illustrating the display panel illustrated in FIG. 1. FIG. 8A is a plan view illustrating an area AA of FIG. 7 according to one or more embodiments of the invention. FIG. 8B is a plan view illustrating an area AA of FIG. 7 according to one or more embodiments of the invention. FIG. 7 illustrates a plurality of touch sensors TSE1-1 to TSE1-k and TSE2-1 to TSE2-k. The touch sensors may be disposed on the lower surface of the first base substrate SUB1, as illustrated in FIG. 4.

Each of the touch sensors TSE1-1 to TSE1-k and TSE2-1 to TSE2-k has a shape that extends in the second direction DR2. Each of the touch sensors TSE1-1 to TSE1-k and TSE2-1 to TSE2-k may have various widths (i.e., lengths in the first direction DR1) along the second direction DR2. For example, a first width of the touch sensor TSE1-1 may be closer to a first edge of the display panel DP than a second width of the touch sensor TSE1-1 and may be larger than the second width of the touch sensor TSE1-1, wherein the first edge of the display panel DP may extend in the first direction DR1.

The touch sensors TSE1-1 to TSE1-k and TSE2-1 to TSE2-k are disposed in and/or overlap a portion of the display area DA. The display area DA includes the pixels areas $PXA_{11}$ to $PXA_{nm}$, as illustrated in FIG. 1.

The non-display area NDA is disposed adjacent to and may surround the display area DA. The non-display area NDA may overlap (a portion of) the black matrix BM (illustrated in FIG. 4). Substantial portions of connection lines RL1-1 to RL1-k and RL2-1 to RL2-k are disposed in the non-display area NDA.

The connection lines RL1-1 to RL1-k and RL2-1 to RL2-k are electrically connected to the touch sensors TSE1-1 to TSE1-k and TSE2-1 to TSE2-k, respectively. The connection lines RL1-1 to RL1-k and RL2-1 to RL2-k may transmit (and apply) the output signals TSS1-1 to TSS1-k and TSS2-1 to TSS2-k output from the touch sensors TSE1-1 to TSE1-k and TSE2-1 to TSE2-k to the touch sensing part 400 (illustrated in FIG. 1).

The touch sensors TSE1-1 to TSE1-k and TSE2-1 to TSE2-k include first-type touch sensors TSE1-1 to TSE1-k (or first touch sensors TSE1-1 to TSE1-k, for conciseness) and second-type touch sensors TSE2-1 to TSE2-k (or second touch sensors TSE2-1 to TSE2-k, for conciseness) having a configuration and/or a shape different from the configuration and/or the shape of the first touch sensors TSE1-1 to TSE1-k. The width (i.e., length in the first direction DR1) of each of the first touch sensors TSE1-1 to TSE1-k may decrease along the second direction DR2. The width (i.e., length in the first direction DR1) of each of the second touch sensors TSE2-1 to TSE2-k may increase along the second direction DR2. For example, a first width of the touch sensor TSE1-1 may be closer to a first edge of the display panel DP than a second width of the touch sensor TSE1-1 and may be larger than the second width of the touch sensor TSE1-1, and a first width of the touch sensor TSE2-1 may be closer to the first edge of the display panel DP than a second width of the touch sensor TSE2-1 and may be less than the second width of the touch sensor TSE2-1, wherein the first edge of the display panel DP may extend in the first direction DR1.

As illustrated in FIG. 7, the first touch sensors TSE1-1 to TSE1-k are alternately arranged with the second touch sensors TSE2-1 to TSE2-k. Each of the first touch sensors TSE1-1 to TSE1-k has a substantially right-angled triangular shape, and each of the second touch sensors TSE2-1 to TSE2-k has a substantially right-angled triangular shape obtained by rotating one of the first touch sensors TSE1-1 to TSE1-k by an angle of 180 degrees. Among the first touch sensors TSE1-1 to TSE1-k and the second touch sensors TSE2-1 to TSE2-k, each first touch sensor (e.g., TSE1-1) and an immediately neighboring second touch sensor (e.g., TSE2-1) are disposed such that the hypotenuse of the substantially right-angled triangular shape of the first touch sensor may face and/or may be substantially parallel to the hypotenuse of the substantially right-angled triangular shape of the second touch sensor.

Referring to FIG. 8A, the first touch sensor TSE1-1 and the second touch sensor TSE2-1 may respectively overlap corresponding pixel areas PXAs of the pixel areas $PXA_{11}$ to $PXA_{nm}$ (illustrated in FIG. 1). The first touch sensor TSE1-1 and the second touch sensor TSE2-1 are formed of a transparent conductive material, e.g., a transparent metal oxide, configured to allow light to transmit through the corresponding pixel areas PXA.

Referring to FIG. 8B, the first touch sensor TSE1-1 and the second touch sensor TSE2-1 may overlap the light blocking area LSA adjacent to the corresponding pixel areas PXA. Each of the first touch sensor TSE1-1 and the second touch sensor TSE2-1 may have a lattice structure having a plurality of openings TSE-OPs. The first touch sensor TSE1-1 and the second touch sensor TSE2-1 include a plurality of horizontal portions TSE-Ls extended in the first direction DR1 and a plurality of vertical portions TSE-Cs extended in the second direction DR2.

The horizontal portions TSE-L and the vertical portions TSE-C are connected to each other to form a plurality of openings TSE-OPs. In other words, each of the first touch sensor TSE1-1 and the second touch sensor TSE2-1 has a mesh structure with a plurality of openings TSE-OPs. In one or more embodiments, each of the first touch sensor TSE1-1 and the second touch sensor TSE2-1 includes a metal having a low reflectivity, e.g., a reflectivity lower than the reflectivity of at least one of the connection lines RL1-1 to RL1-k and RL2-1 to RL2-k.

Figure 9:
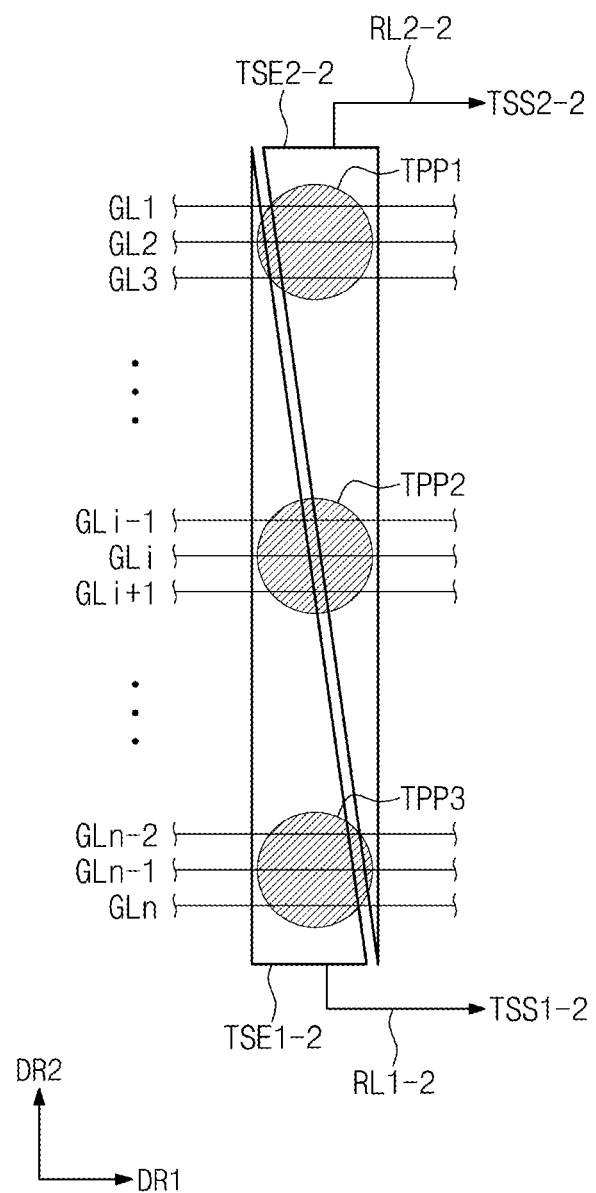
FIG. 9 is a plan view illustrating a first touch sensor, a second touch sensor, and gate lines.
Figure 10:
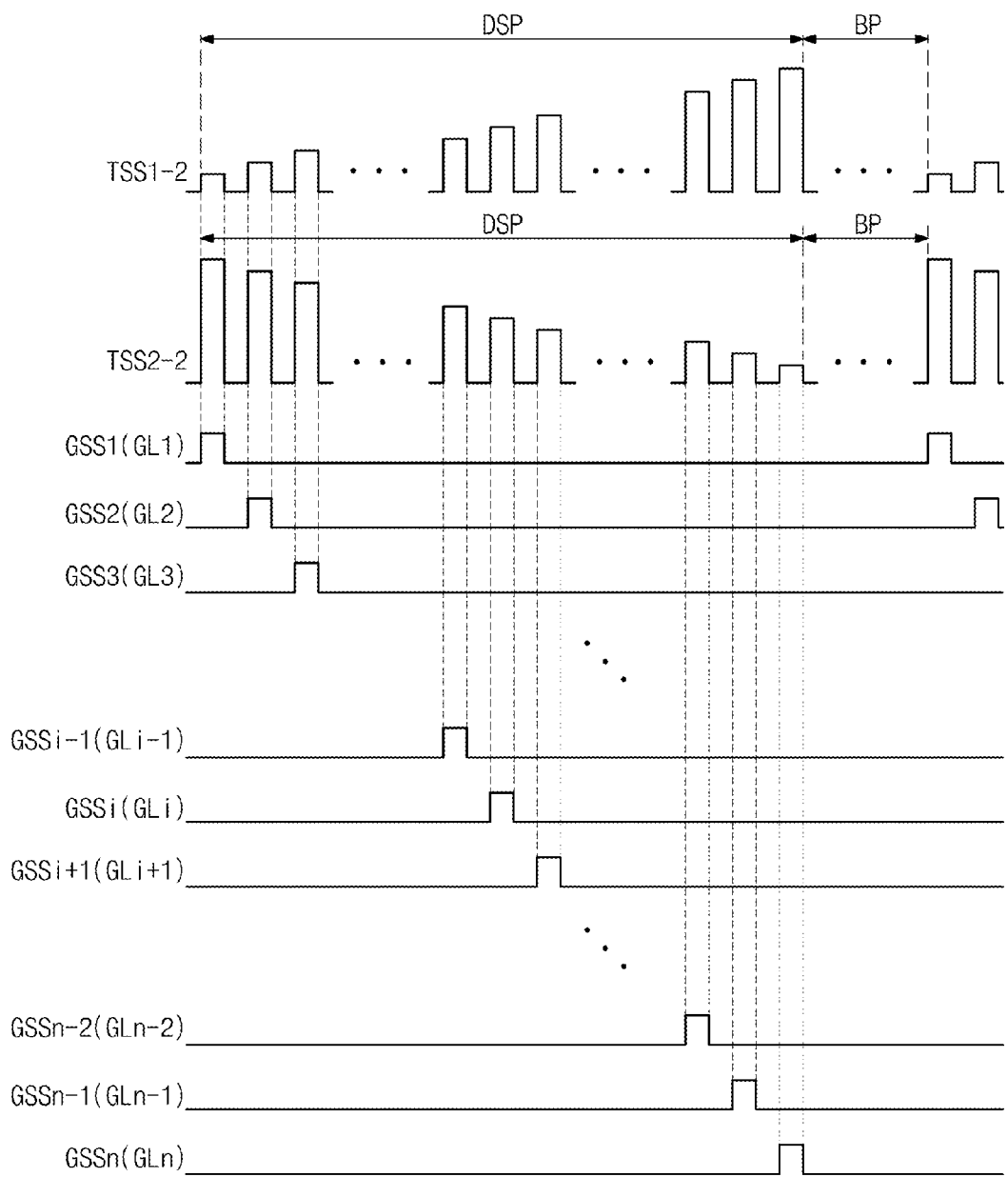
FIG. 10 is a timing diagram illustrating a relation between gate signals and output signals output from touch sensors.
Figure 11A:
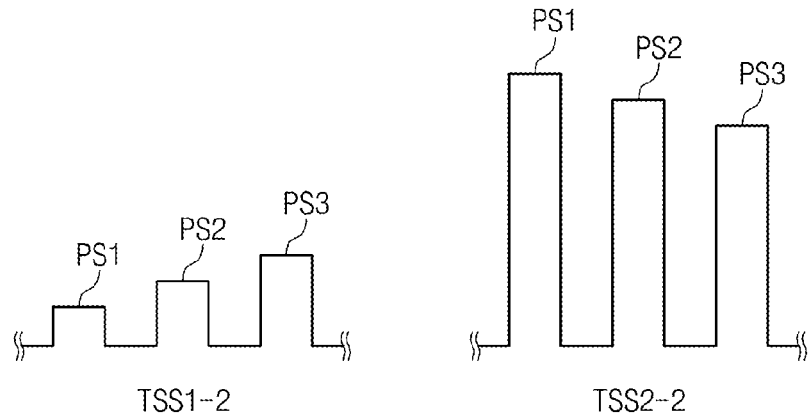
FIGS. 11A to 11C are views illustrating pulses used for calculating coordinate information.
Figure 11B:
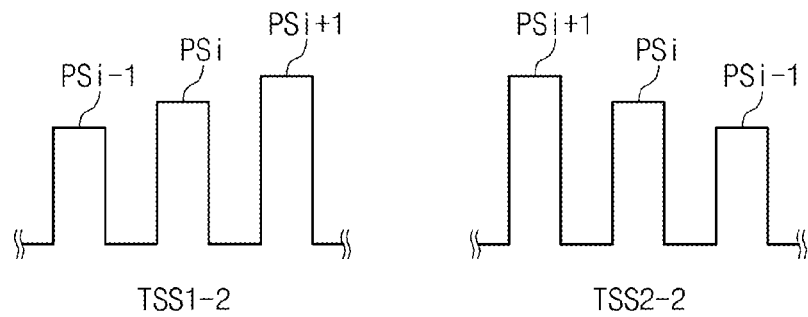
Figure 11C:
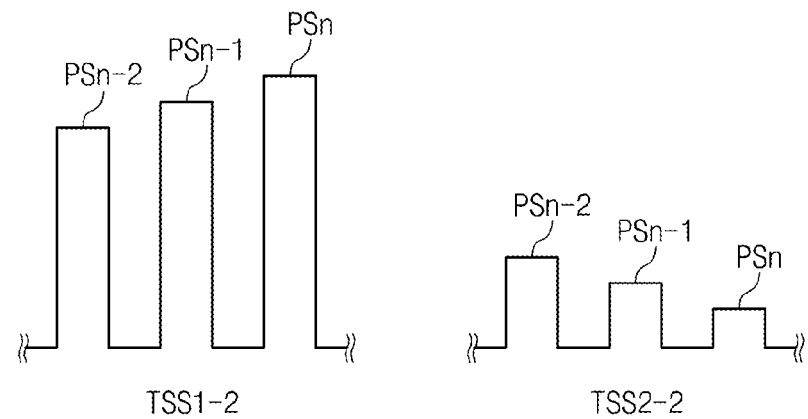

FIG. 9 is a plan view illustrating a first sensor TSE1-2, a second touch sensor TSE2-2, and gate lines. FIG. 10 is a timing diagram illustrating a relation between gate signals and output signals output from touch sensors. FIGS. 11A to 11C are views illustrating pulses used to calculate coordinate information.

As illustrated in FIGS. 7 and 9, the first touch sensor TSE1-2 and the second touch sensor TSE2-2 are disposed at a second position among the touch sensors TSE1-1 to TSE1-k and TSE2-1 to TSE2-k. In addition, the first touch position TPP1, the second touch position TPP2, and the third touch position TPP3 have different coordinate information in the second direction DR2.

When the gate signals GSS1 to GSSn are sequentially applied to the gate lines GL1 to GLn, the gate lines GL1 to GLn and the first touch sensor TSE1-2 form at least a capacitor $C_{GT}$ (analogous to the capacitor $C_{GT}$ illustrated in FIG. 5). In addition, the second touch sensor TSE2-2 forms at least a capacitor $C_{GT}$ together with the gate lines GL1 to GLn.

Referring to FIG. 10, the first touch sensor TSE1-2 outputs a first output signal TSS1-2, and the second touch sensor TSE2-2 outputs a second output signal TSS2-2. Each of the first output signal TSS1-2 and the second output signal TSS2-2 includes a plurality of pulses. The pulses are generated according to and/or substantially synchronized with the gate signals GSS1 to GSSn.

The pulses of each of the output signals TSS1-2 and TSS2-2 have levels determined depending on the overlap areas between the gate lines GL1 to GLn and the first touch sensor TSE1-2 or between the gate lines GL1 to GLn and the second touch sensor TSE2-2. The overlap area between the gate lines GL1 to GLn and the first touch sensor TSE1-2 may correspond to the width (i.e., lengths in the first direction DR1) of the first touch sensor TSE1-2 and may increase toward the last gate line GLn (i.e., in a direction opposite to the second direction DR2). For example, the area where the first touch sensor TSE1-2 overlaps the first gate line GL1 may be substantially less than the area where the first touch sensor TSE1-2 overlaps the last gate line GLn. Thus, an amount of electric charges charged in the capacitor $C_{GT}$ formed by the gate lines GL1 to GLn and the first touch sensor TSE1-2 may increase toward the last gate line GLn, and the levels of the pulses of the first output signal TSS1-2 may increase toward the last gate line GLn. For example, the pulse associated with the first gate line GL1 may be lower than the pulse associated with the second gate line GL2, which may be lower than the pulse associated with the third gate line GL3, which may be lower than the pulse associated with the last gate line GLn.

On the other hand, the overlap area between the gate lines GL1 to GLn and the second touch sensor TSE2-2 may correspond to the width (i.e., lengths in the first direction DR1) of the first touch sensor TSE1-2 and may decrease toward the last gate line GLn. Thus, the levels of the pulses of the second output signal TSS2-2 may decrease toward the last gate line GLn.

During the display period DSP, the touch sensing part 400 (refer to FIG. 1) may determine, for a plurality of times, whether a touch event occurs. The touch sensing part 400 may determine whether the touch event occurs using (only) a portion of the pulses of the first output signal TSS1-2 and/or (only) a portion of the pulses of the second output signal TSS2-2.

FIG. 11A illustrates the first output signal TSS1-2 and the second output signal TSS2-2 generated according to the first gate signal GSS1, the second gate signal GSS2, and the third gate signal GSS3 respectively applied to the first gate line GL1, the second gate line GL2, and the third gate line GL3 (illustrated in FIG. 9).

When a touch event occurs (e.g., at one of the positions TPP1, TPP2, and TPP3), the levels of the pulses PS1 to PS3 (generated according to the gate signals GSS1 to GSS3 are varied by the variable capacitor $C_{TT}$ (illustrated in FIG. 5) formed between the input device (e.g., a user's finger or a stylus) and at least one of the first touch sensor TSE1-2 and the second touch sensor TSE2-2. At time points at which the gate signals GSS1 to GSS3 are activated, the touch sensing part 400 measures at least a variation of the levels of the pulses PS1 to PS3 to detect the touch event.

The variation amounts of the pulses PS1 to PS3 may depend on the position of the touch event, e.g., one of touch positions TPP1, TPP2, and TPP3. This will be further discussed with reference to FIGS. 12A and 12B.

FIG. 11B illustrates the first output signal TSS1-2 and the second output signal TSS2-2 generated according to the (i−1)th gate signal GSSi−1, the ith gate signal GSSi, and the (i+1)th gate signal GSSi+1 respectively applied to the (i−1)th gate line GLi−1, the ith gate line GLi, and the (i+1)th gate line GLi+1 (illustrated in FIG. 9). FIG. 11C illustrates the first output signal TSS1-2 and the second output signal TSS2-2 generated according to the (n−2)th gate signal GSSn−2, the (n−1)th gate signal GSSn−1, and the nth gate signal GSSn respectively applied to the (n−2)th gate line GLn−2, the (n−1)th gate line GLn−1, and the nth gate line GLn (illustrated in FIG. 9).

At one or more activation time points, the touch sensing part 400 may detect a touch event using one or more pulses generated according to one or more gate signals, such as one or more of the gate signals GSSi−1 to GSSi+1 and the gate signals GSSn−2 to GSSn. In one or more embodiments, during a display period DSP, the touch sensing part 400 may detect touch once at every three pulses of the first output signal TSS1-2 and/or the second output signal TSS2-2. Accordingly, although several touch events may occur during the display period DSP, the touch sensing part 400 may detect all the touch events.

In one or more embodiments, the period (or frequency) in which the touch sensing part 400 detects touch events may be changed and/or may be variable. In one or more embodiments, the touch sensing part 400 may detect touch events once at every five pulses of the first output signal TSS1-2 and/or the second output signal TSS2-2. In one or more embodiments, the touch sensing part 400 may detect whether there is a touch event only once in every display period DSP.

Figure 12A:
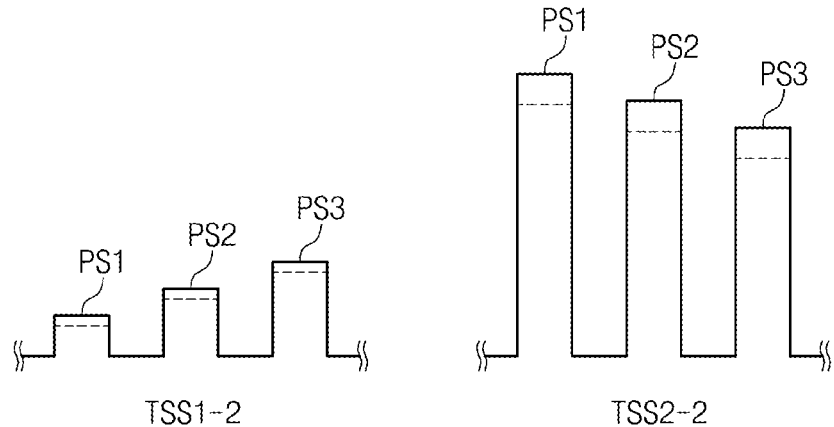
FIGS. 12A to 12C are views illustrating level variations of pulses in accordance with a touch position at which a touch event occurs.
Figure 12B:
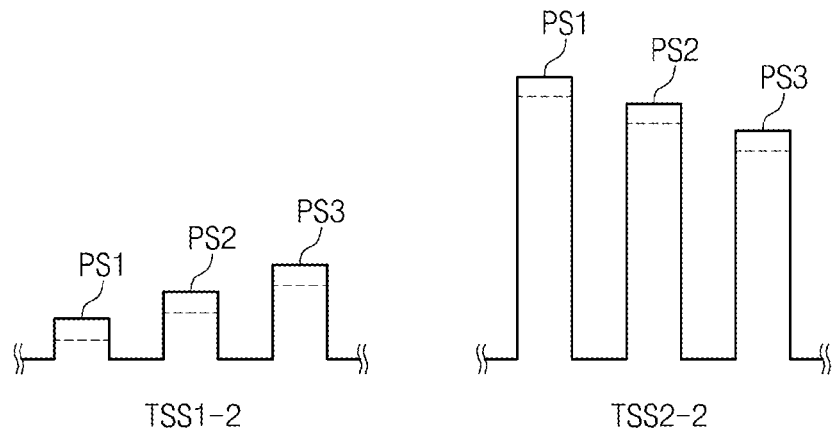
Figure 12C:
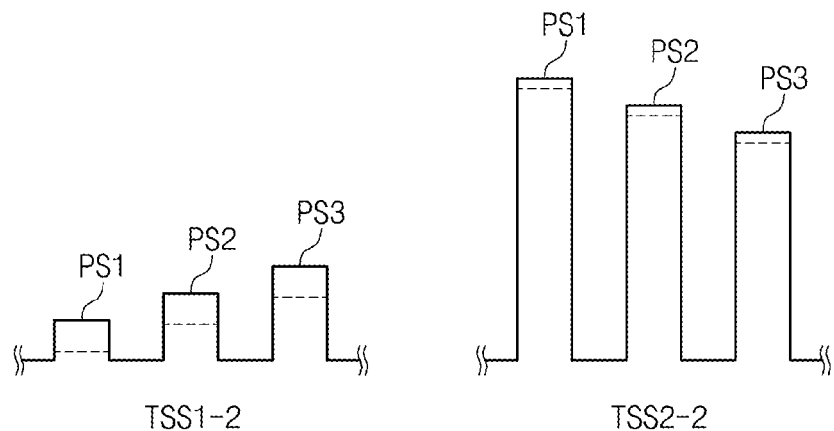

A method for calculating the coordinate of a touch position is discussed with further reference to FIGS. 12A to 12C. FIGS. 11A and 12A to 12C are views illustrating level variations of pulses in accordance with touch positions. In FIGS. 12A to 12C, a dotted line indicates a pulse level when a touch event occurs.

The coordinate of the touch position in the first direction DR1 is calculated based on the position of at least one touch sensors outputting at least one output signal with at least one varied pulse levels (relative to pulse levels of output signals provided by other touch sensors of the same type. For instance, if the level of the output signal output from at least one of the first touch sensor TSE1-2 and the second touch sensor TSE2-2, which are disposed at the second position, is varied (relative to other first-type touch sensors and/or other second-type touch sensors), the second position may be the coordinate information of the touch position in the first direction DR1. In one or more embodiments, the coordinate information of the touch position in the first direction DR1 may be calculated based on only output signals of first touch sensors or only output signals of second touch sensors.

The coordinate information of the touch position in the second direction DR2 may be calculated based on the variation amounts of the levels of the pulses of at least one of an output signal of a first touch sensor and an output signal of a second touch sensor, such as the pulse level variation amounts of the first output signal TSS1-2 and/or the second output signal TSS2-2. Referring to FIGS. 12A to 12C, the variation amounts of the levels of the pulses of the first output signal TSS1-2 may be substantially different from the variation amounts of the levels of the pulses of the second output signal TSS2-2.

FIG. 12A illustrates the variations of the pulses when a touch event occurs at the first touch position TPP1 (illustrated in FIG. 9). Given the configurations of the touch sensors TSE1-2 and TSE2-2, the overlap area between the input device and the first touch sensor TSE1-2 is smaller than the overlap area between the input device and the second touch sensor TSE2-2. Accordingly, a decrease rate of the pulses PS1 to PS3 of the first output signal TSS1-2 is smaller than a decrease rate of the pulses PS1 to PS3 of the second output signal TSS2-2.

FIG. 12B illustrates the variations of the pulses when a touch event occurs at the second touch position TPP2 (illustrated in FIG. 9), and FIG. 12C illustrates the variations of the pulses when a touch event occurs at the third touch position TPP3 (illustrated in FIG. 9). As the overlap area between the input device and the first touch sensor TSE1-2 increases (toward the last gate line GLn), the decrease rate(s) of the pulses of the first output signal TSS1-2 may increase (toward the last gate line GLn). As the overlap area between the input device and the second touch sensor TSE2-2 decreases (toward the last gate line GLn), the decrease rate(s) of the pulses of the second output signal TSS2-2 may decrease (toward the last gate line GLn).

The coordinate information of the touch position in the second direction DR2 may be calculated based on the decrease rate(s) of at least one the pulses of the first output signal TSS1-2 or the second output signal TSS2-2. This calculation method may be applied to the pulses illustrated in FIGS. 11A, 11B, and 11C. In one or more embodiments, the coordinate information of the touch position in the second direction DR2 may be more precisely calculated based on both the decrease rate(s) of the pulses of the first output signal TSS1-2 and the decrease rate(s) of the pulses of the second output signal TSS2-2, which may be in reverse proportion and/or may be mutually complementary.

Figure 13:
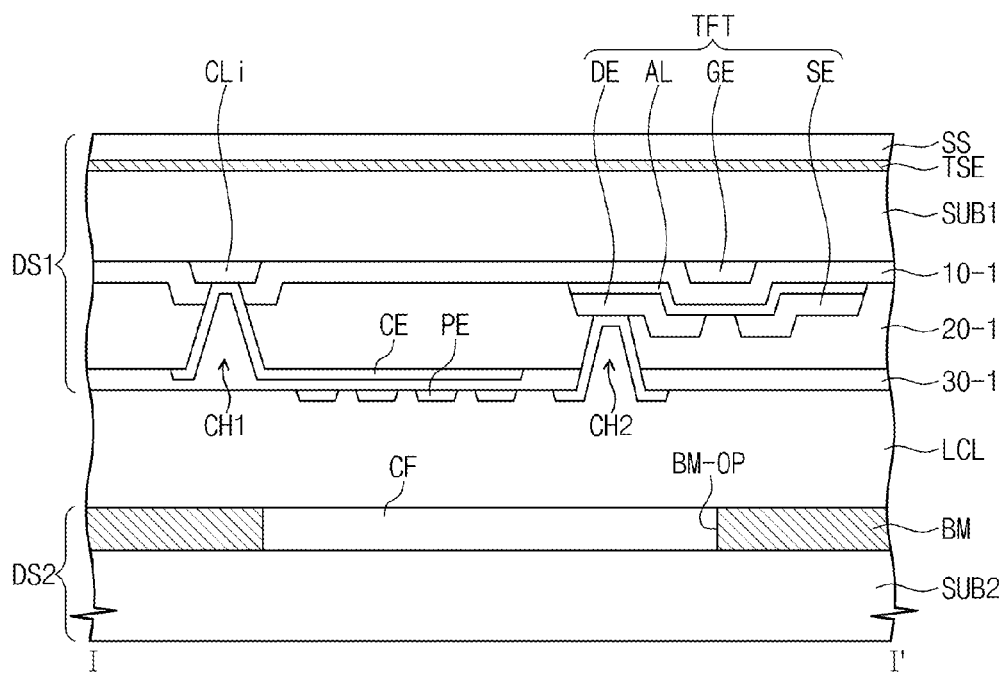
FIG. 13 is a cross-sectional view illustrating a display panel according to one or more embodiments of the present invention.

FIG. 13 is a cross-sectional view illustrating a display panel according to one or more embodiments of the present invention. In FIG. 13, the same reference numerals may denote the same elements and/or analogous elements illustrated in one or more of FIGS. 1 to 12C, and descriptions of the same elements and/or the analogous elements may be omitted to avoid unnecessary repetition.

In the display panel illustrated in FIG. 13, the first base substrate SUB1 may be disposed between gate lines (not illustrated), which may directly contact a first surface of the first base substrate SUB1, and the touch sensor TSE, which may directly contact a second surface of the first base substrate SUB1.

Referring to FIG. 13, the common line CLi and the gate electrode GE (which is branched from a gate line) are disposed (directly) on the lower surface (i.e., the first surface) of the first base substrate SUB1. A first insulating layer 10-1 is disposed on the lower surface of the first base substrate SUB1 to cover the common line CLi and the gate line. The first insulating layer 10-1 may correspond to the second insulating layer 20 illustrated in FIG. 4.

The touch sensor TSE is disposed (directly) on the upper surface (i.e., the second surface) of the first base substrate SUB1. A protective plate SS is disposed on the upper surface of the first base substrate SUB1 to protect the touch sensor TSE. In one or more embodiments, an insulating layer (not illustrated) may be disposed between the touch sensor TSE and the upper surface of the first base substrate SUB1.

Figure 14:
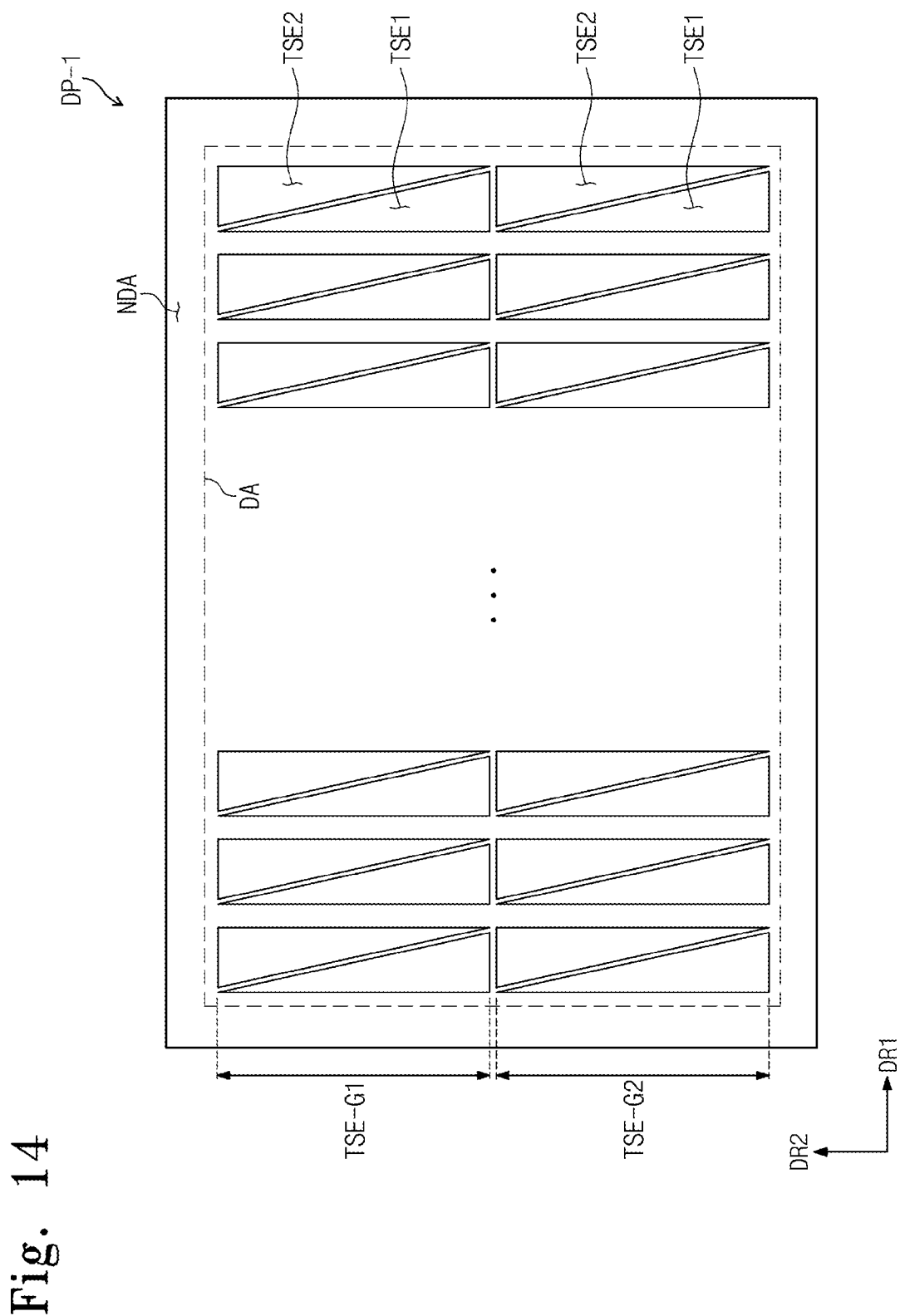
FIG. 14 is a plan view illustrating a display panel according to one or more embodiments of the present invention.

FIG. 14 is a plan view illustrating a display panel DP-1 according to one or more embodiments of the present invention. In FIG. 14, the same reference numerals may denote analogous elements and/or the same elements illustrated in one or more of FIGS. 1 to 13, and descriptions of the analogous elements and/or the same elements may be omitted to avoid unnecessary repetition.

Referring to FIG. 14, the touch sensors TSEs, which are disposed in the display panel DP-1, may be divided into a plurality of groups. The plural groups are arranged in the second direction DR2. FIG. 14 illustrates two groups TSE-G1 and TSE-G2. One or more of the connections connected to the touch sensors of each of the two groups TSE-G1 and TSE-G2 may be analogous to one or more the connections discussed with reference to FIG. 7.

Each of the two groups TSE-G1 and TSE-G2 includes first-type touch sensors TSE1s and second-type touch sensors TSE2s extending in the second direction DR2 and arranged in the first direction DR1. The touch sensors TSE1 and TSE2 of each of the two groups TSE-G1 and TSE-G2 may perform one or more functions that are analogous to one or more functions of the touch sensors TSE1-1 to TSE1-k and TSE2-1 to TSE2-k illustrated in FIG. 7.

The method for calculating the coordinate information of the touch position associated with each of the two groups TSE-G1 and TSE-G2 may be substantially the same as the method described with reference to FIGS. 9 to 12C, but the two groups TSE-G1 and TSE-G2 may have different coordinate information (e.g., different coordinate references) in the second direction DR2.

In one or more embodiments, the touch sensor group including the touch sensor that outputs the output signal with varied pulse level(s) may be identified. Subsequently, the coordinate information of the touch position in the second direction DR2 may be calculated using coordinate reference information related to the identified touch sensor group and using the method described with reference to FIGS. 9 to 12C.

Figure 15A:
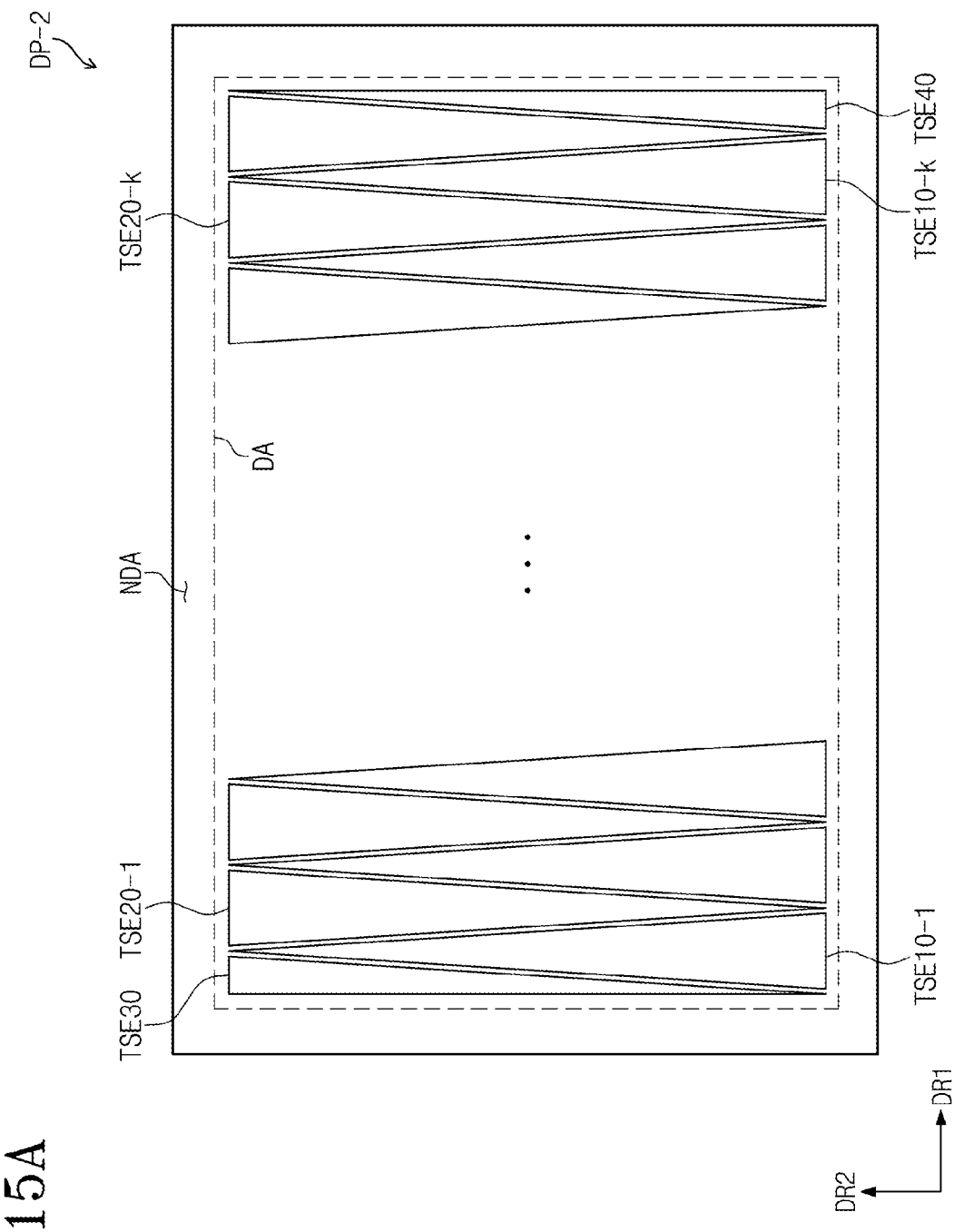
FIG. 15A is a plan view illustrating a display panel according to one or more embodiments of the present invention.

FIG. 15A is a plan view illustrating a display panel DP-2 according to one or more embodiments of the present invention. Referring to FIG. 15A, the display panel DP-2 includes first-type touch sensors (or first touch sensors) TSE10-1 to TSE10-k and second-type touch sensors (or second touch sensors) TSE20-1 to TSE20-k having a configuration and/or a shape different from the configuration and/or the shape of the first touch sensors TSE10-1 to TSE10-k. Each of the first touch sensors TSE10-1 to TSE10-k has an isosceles triangular shape, and each of the second touch sensors TSE20-1 to TSE20-k has an isosceles triangular shape obtained by rotating one of the first touch sensors TSE10-1 to TSE10-k by an angle of 180 degrees. The first touch sensors TSE10-1 to TSE10-k may have the same total area as the second touch sensors TSE20-1 to TSE20-k.

The first touch sensors TSE10-1 to TSE10-k are alternately arranged with the second touch sensors TSE20-1 to TSE20-k. A vertex of one of the first touch sensors TSE10-1 to TSE10-k is adjacent to a bottom side of one of the second touch sensors TSE20-1 to TSE20-k and may be disposed between bottom sides of two of the second touch sensors TSE20-1 to TSE20-k, and a vertex of one of the second touch sensors TSE20-1 to TSE20-k is adjacent to a bottom side of the first touch sensors TSE10-1 to TSE10-k and may be disposed between bottom sides of two of the first touch sensors TSE10-1 to TSE10-k.

The display panel DP-2 may further include a third touch sensor TSE30 and a fourth touch sensor TSE40, each having a shape and/or a configuration different from the shape and/or the configuration of any of the touch sensors TSE10-1 to TSE10-k and the touch sensors TSE20-1 to TSE20-k. The third touch sensor TSE30 and the fourth touch sensor TSE40 are disposed in areas of the display area DA where the first touch sensors TSE10-1 to TSE10-k and the second touch sensors TSE20-1 to TSE20-k are not disposed. The width (i.e., length in the first direction DR1) of each of the touch sensors TSE30 and TSE40 may vary along the second direction DR2. Each of the touch sensors TSE30 and TSE40 may have a right-angled triangular shape. The first touch sensors TSE10-1 to TSE10-k and the second touch sensors TSE20-1 to TSE20-k may be disposed between the third touch sensor TSE30 and the fourth touch sensor TSE40.

Figure 15B:
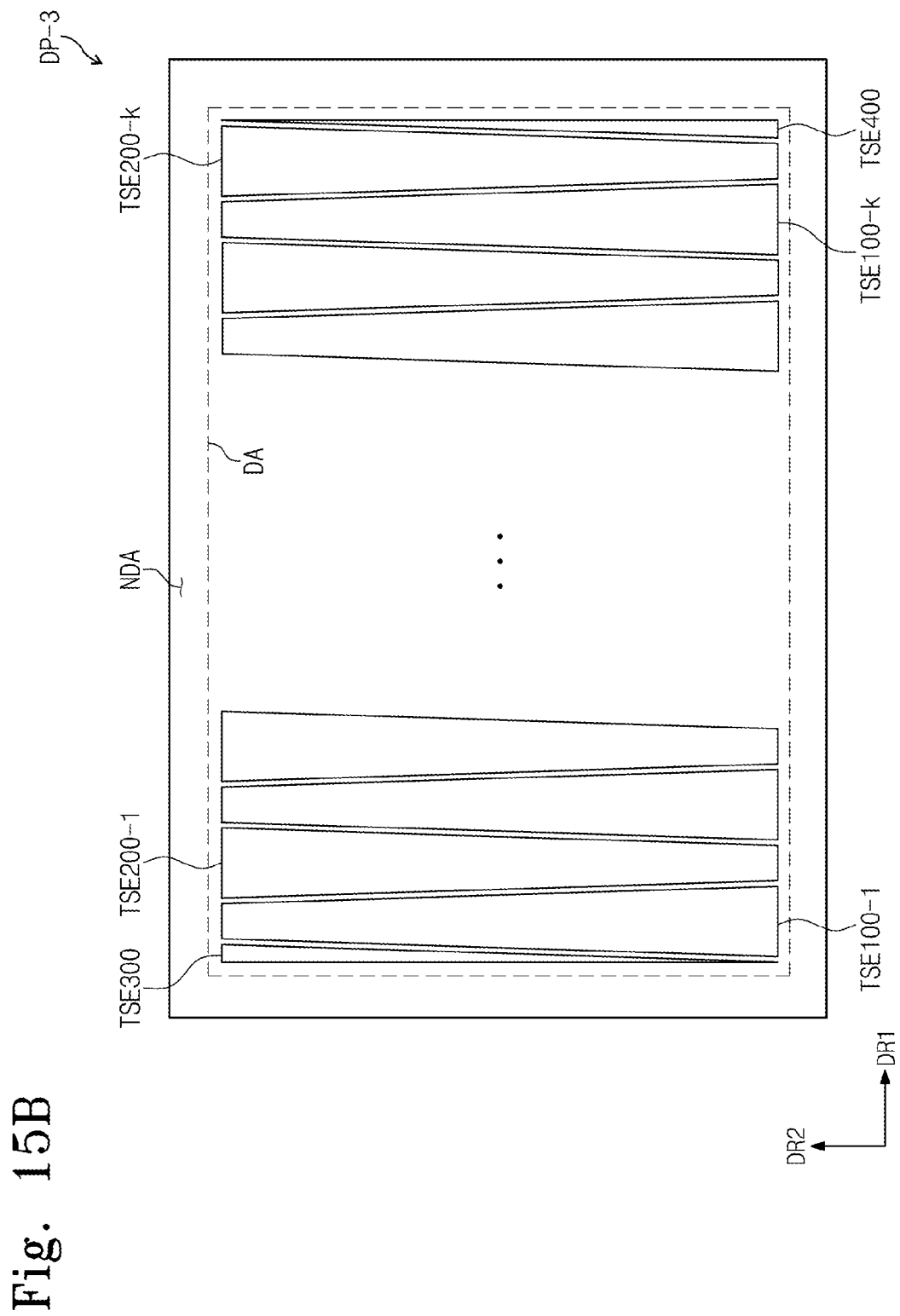
FIG. 15B is a plan view illustrating a display panel according to one or more embodiments of the present invention.

FIG. 15B is a plan view illustrating a display panel DP-3 according to one or more embodiments of the present invention. Referring to FIG. 15B, the display panel DP-3 includes first touch sensors TSE100-1 to TSE100-k and second touch sensors TSE200-1 to TSE200-k having a configuration and/or a shape different from the configuration and/or the shape of the first touch sensors TSE100-1 to TSE100-k. The first touch sensors TSE100-1 to TSE100-k are alternately arranged with the second touch sensors TSE200-1 to TSE200-k.

Each of the first touch sensors TSE100-1 to TSE100-k has an equilateral trapezoid shape, and each of the second touch sensors TSE200-1 to TSE200-k has an equilateral trapezoid shape obtained by rotating one of the first touch sensors TSE100-1 to TSE100-k by an angle of 180 degrees.

The display panel DP-3 may further include a third touch sensor TSE300 and a fourth touch sensor TSE400, each having a shape and/or a configuration different from the shape and/or the configuration of any of the touch sensors TSE100-1 to TSE100-k and the touch sensors TSE200-1 to TSE200-k. The third touch sensor TSE300 and the fourth touch sensor TSE400 may have one or more features that are analogous to one or more features of the third touch sensor TSE30 and the fourth touch sensor TSE40 discussed with reference to FIG. 13A.

FIG. 15C is a plan view illustrating a display panel DP-4 according to one or more embodiments of the present invention. Referring to FIG. 15C, the display panel DP-4 includes first touch sensors TSE1000-1 to TSE1000-k and second touch sensors TSE2000-1 to TSE2000-k having a configuration, a shape, and an area different from the configuration, the shape, and the area of the first touch sensors TSE1000-1 to TSE1000-k.

Each of the first touch sensors TSE1000-1 to SE1000-k and the second touch sensors TSE2000-1 to TSE2000-k may have a shape obtained by deforming an isosceles triangular shape, e.g., at the two isosceles sides. Each of the first touch sensors TSE1000-1 to TSE1000-k includes one bottom side, two isosceles sides that are convex with respect to the bottom side, and three vertices. Each of the second touch sensors TSE2000-1 to TSE2000-k includes one bottom side, two isosceles sides that are concave with respect to the bottom side, and three vertices. The length of the bottom side of each of the first touch sensors TSE1000-1 to TSE1000-k may be equal to the length of the bottom side of each of the second touch sensors TSE2000-1 to TSE2000-k. The first touch sensors TSE1000-1 to TSE1000-k are alternately arranged with the second touch sensors TSE2000-1 to TSE2000-k.

The display panel DP-4 may further include a third touch sensor TSE3000 and a fourth touch sensor TSE4000 disposed in areas of the display area DA where the first touch sensors TSE1000-1 to TSE1000-k and the second touch sensors TSE2000-1 to TSE2000-k are not disposed. The third touch sensor TSE3000 and the fourth touch sensor TSE4000 have a deformed right-angled triangular shape. The third touch sensor TSE3000 has a concave hypotenuse (with respect to the right angle) and the fourth touch sensor TSE4000 has a convex hypotenuse (with respect to the right angle).

Figure 16:
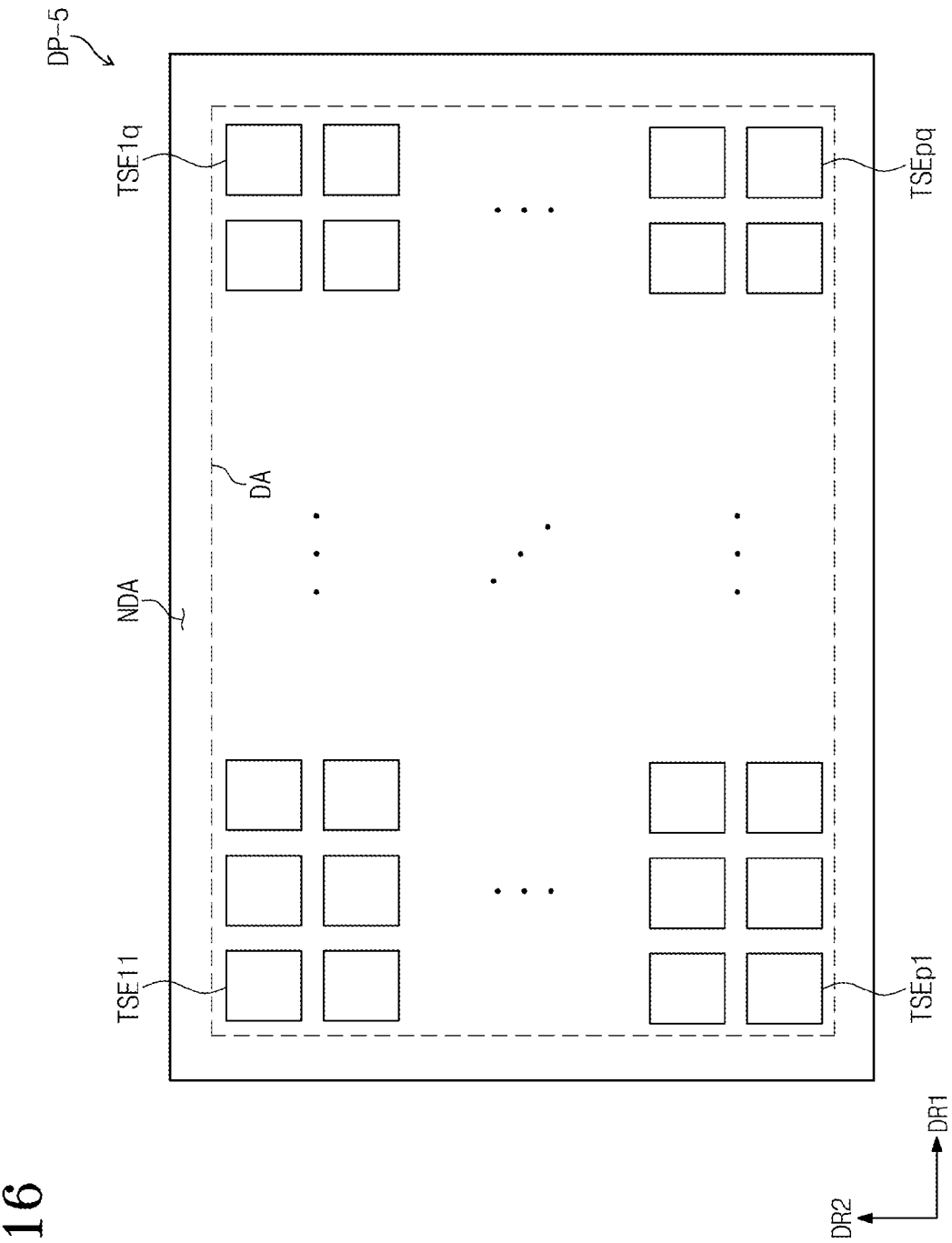
FIG. 16 is a plan view illustrating a display panel according to one or more embodiments of the present invention.

FIG. 16 is a plan view illustrating a display panel DP-5 according to one or more embodiments of the present invention. The display panel DP-5 may include one or more elements that are analogous to or the same as one or more elements discussed with reference to one or more of FIGS. 1 to 13, and detailed descriptions of analogous elements and/or the same elements may be omitted for avoiding unnecessary repetition.

Referring to FIG. 16, the display device DP-5 includes a plurality of touch sensors TSE11 to TSEpq arranged in a matrix form. The touch sensors TSE11 to TSEpq are disposed on or under the first base substrate SUB1.

The touch sensors TSE11 to TSEpq have the same shape and area. The touch sensors TSE11 to TSEpq may have a square shape, a circular shape, or a polygonal shape.

Although not illustrated in FIG. 16, connection lines may be disposed to apply output signals from the touch sensors TSE11 to TSEpq to the touch sensing part 400. The connection lines may overlap the light blocking area LSA (illustrated in FIG. 2).

The touch sensors TSE11 to TSEpq are capacitively coupled to the gate lines GL1 to GLn, which may be applied with gate voltages. Each of the touch sensors TSE11 to TSEpq may have inherent coordinate information. Accordingly, the coordinate information of a touch position may be determined and/or calculated by detecting the touch sensor having an abnormal or varied output signal.

Although the embodiments of the present invention have been described, it is understood that the present invention should not be limited to these embodiments. Various changes and modifications can be made by one ordinary skilled in the art within the spirit and scope of the present invention as hereinafter claimed.

What is claimed is:

1. A display device comprising:
   a first base substrate that provides a touch surface and includes a light blocking area and a plurality of pixel areas;
   a plurality of gate lines disposed on the first base substrate, extended in a first direction, arranged in a second direction crossing the first direction, and respectively applied with gate signals having different activation periods;
   a plurality of pixels disposed to respectively correspond to the pixel areas and activated in response to the gate signals;
   a plurality of touch sensors disposed on the first base substrate and capacitively coupled to the gate lines using the gate signals as sensing signals; and
   a touch sensing part that calculates a coordinate information of a touch position using output signals provided from the touch sensors.

2. The display device of claim 1, wherein the touch sensors are extended in the second direction and a width in the first direction of each of the touch sensors is varied along the second direction.

3. The display device of claim 2, wherein the touch sensors comprise:
   first touch sensors each having the width in the first direction, which increases along the second direction; and
   second touch sensors each having the width in the first direction, which decreases along the second direction.

4. The display device of claim 3, wherein the first touch sensors are alternately arranged with the second touch sensors.

5. The display device of claim 2, wherein each of the output signals comprises a plurality of pulses having different levels and being generated on the basis of the gate signals.

6. The display device of claim 5, wherein the touch sensing part calculates a coordinate information of the touch position in the second direction on the basis of a variation of the level of the pulses.

7. The display device of claim 5, wherein the touch sensing part calculates a coordinate information of the touch position on the basis of a portion of the pulses.

8. The display device of claim 2, wherein the touch sensors are divided into a plurality of groups and the groups are arranged in the second direction.

9. The display device of claim 1, further comprising a second base substrate disposed to be spaced apart from the first base substrate, and a liquid crystal layer disposed between the first base substrate and the second base substrate.

10. The display device of claim 9, further comprising a plurality of data lines disposed on the first base substrate, extended in the second direction, arranged in the first direction, and applied with data voltages.

11. The display device of claim 10, wherein each of the pixels comprises:
   a thin film transistor connected to a corresponding gate line of the gate lines and a corresponding data line of the data lines to output a data signal applied to the corresponding data line in response to the gate signal applied to the corresponding gate line;

a pixel electrode connected to the thin film transistor to receive a pixel voltage corresponding to the data signal; and a common electrode that forms an electric field in cooperation with the pixel electrode.

12. The display device of claim 1, wherein each of the touch sensors comprises opening portions overlapped with a portion of the pixel areas.

13. The display device of claim 1, wherein the touch sensors are arranged in a matrix form.

14. A display device comprising:
a first pixel electrode corresponding to a first pixel area;
a transistor electrically connected to the first pixel electrode;
a plurality of gate lines extending in a first direction and including a first gate line, the first gate line being electrically connected to the transistor and being configured to transmit a first gate signal for controlling the transistor;
a plurality of first-type sensors including a first first-type sensor, the first first-type sensor being configured to provide a first output signal according to at least the first gate signal; and
a processing part electrically connected to the first first-type sensor and configured to use the first output signal for determining a first coordinate value associated with a touch applied on the display device.

15. The display device of claim 14, wherein the first first-type sensor is configure to provide the first output signal according to a plurality of gate signals sequentially transmitted by the plurality of gate lines.

16. The display device of claim 14,
wherein a first portion of the first first-type sensor is located closer to the first gate line than a second portion of the first first-type sensor, and
wherein in the first direction the first portion of the first first-type sensor is shorter than the second portion of the first first-type sensor.

17. The display device of claim 16,
wherein the second portion of the first first-type sensor is disposed between the first portion of the first first-type sensor and a third portion of the first first-type sensor, and
wherein in the first direction the second portion of the first first-type sensor is shorter than the third portion of the first first-type sensor.

18. The display device of claim 16, further comprising:
a plurality of second-type sensors including a first second-type sensor,
wherein the first second-type sensor is configured to provide a second output signal according to at least the first gate signal, wherein a first portion of the first second-type sensor is aligned with the first portion of the first first-type sensor in the first direction,
wherein a second portion of the first second-type sensor is aligned with the second portion of the first first-type sensor in the first direction, and
wherein in the first direction the first portion of the first second-type sensor is longer than the second portion of the first second-type sensor.

19. The display device of claim 18, wherein the processing part is configured to determine the first coordinate value using at least one of a position of the first first-type sensor and a position of the first second-type sensor after detecting existence of at least one of a difference between a value of the first output signal and a first reference value and a difference between a value of the second output signal and a second reference value.

20. The display device of claim 19, wherein the processing part is configured to determine a second coordinate value associated with the touch using a first amount and a second amount, the first amount corresponding to the difference between the value of the first output signal and the first reference value, the second amount corresponding to the difference between the value of the second output signal and the second reference value.

* * * * *